United States Patent [19]

Seitz et al.

[11] Patent Number: 4,484,192
[45] Date of Patent: Nov. 20, 1984

[54] MOVING MAP DISPLAY

[75] Inventors: William R. Seitz, Royal Oak; Harry R. Farrah, Birmingham, both of Mich.; Gerald A. Brumm; Lansing B. Evans, both of Boca Raton, Fla.; Chris J. Walter, Columbia, Md.

[73] Assignee: The Bendix Corporation, Southfield, Mich.

[21] Appl. No.: 331,724

[22] Filed: Dec. 17, 1981

[51] Int. Cl.³ .................. G08G 1/12; G06F 3/14; G08B 7/00
[52] U.S. Cl. .................... 340/995; 340/721; 340/727; 340/731; 364/449; 364/460
[58] Field of Search ............ 340/27 NA, 24, 731, 340/709, 703, 745, 721, 728, 734, 995, 727; 364/424, 460, 449, 444, 521; 343/452, 409, 451

[56] References Cited

U.S. PATENT DOCUMENTS

| | | | |
|---|---|---|---|
| 3,359,408 | 12/1967 | Briggs | 235/150.27 |
| 3,475,754 | 10/1969 | Scovill | 343/112 |
| 3,486,815 | 12/1969 | Roscoe | 353/11 |
| 3,486,816 | 12/1969 | Streeter | 353/11 |
| 3,538,313 | 11/1970 | Thomas et al. | 235/150.27 |
| 3,577,120 | 5/1971 | Sherbert, Jr. | 340/27 |
| 3,652,836 | 3/1972 | Richardson et al. | 235/150 |
| 3,715,572 | 2/1973 | Bennett | 340/24 |
| 3,786,505 | 1/1974 | Rennie | 343/7 |
| 3,789,198 | 1/1974 | Henson et al. | 340/24 |
| 3,875,405 | 4/1975 | Ferguson | 250/211 R |
| 4,016,544 | 4/1977 | Morita | 340/703 |
| 4,053,893 | 10/1977 | Boyer | 343/112 PT |
| 4,061,995 | 12/1977 | McCrickerd | 340/24 |
| 4,069,784 | 1/1978 | Hedström et al. | 114/144 |
| 4,086,632 | 5/1978 | Lions | 364/444 |
| 4,092,716 | 4/1978 | Berg et al. | 364/424 |
| 4,179,693 | 12/1979 | Evans et al. | 343/5 MM |
| 4,204,206 | 5/1980 | Bakula | 340/721 |
| 4,217,577 | 8/1980 | Roe | 340/703 |
| 4,360,876 | 11/1982 | Girault | 364/449 |
| 4,400,780 | 8/1983 | Nagao | 343/452 |

FOREIGN PATENT DOCUMENTS 2625597 12/1976 Fed. Rep. of Germany .

OTHER PUBLICATIONS

"Television Receiving Equipment", Cocking, 1940, pp. 19–20.

Primary Examiner—James J. Groody
Attorney, Agent, or Firm—James R. Ignatowski; Russel C. Wells; Anthony F. Cuoco

[57] ABSTRACT

Disclosed is a moving map display having a mass memory storing a complete map of the terrain to be traversed by a vehicle, a scan memory storing a portion of the complete map corresponding to the area immediately surrounding the vehicle, a computer for controlling the updating of the portion of map stored in the scan memory and for controlling the refreshing of the map data displayed on a cathode ray tube display, a scan memory address generator receiving parameters computed by the computer for generating addresses sequential outputting the digital map data stored in the scan memory in a predetermined sequence, a video display generator for converting the map data output from the scan memory for utilization by the cathode ray tube display, and a timing generator for synchronizing the generation of the addresses by the scan memory address generator with the scan field of the cathode ray tube display.

54 Claims, 15 Drawing Figures

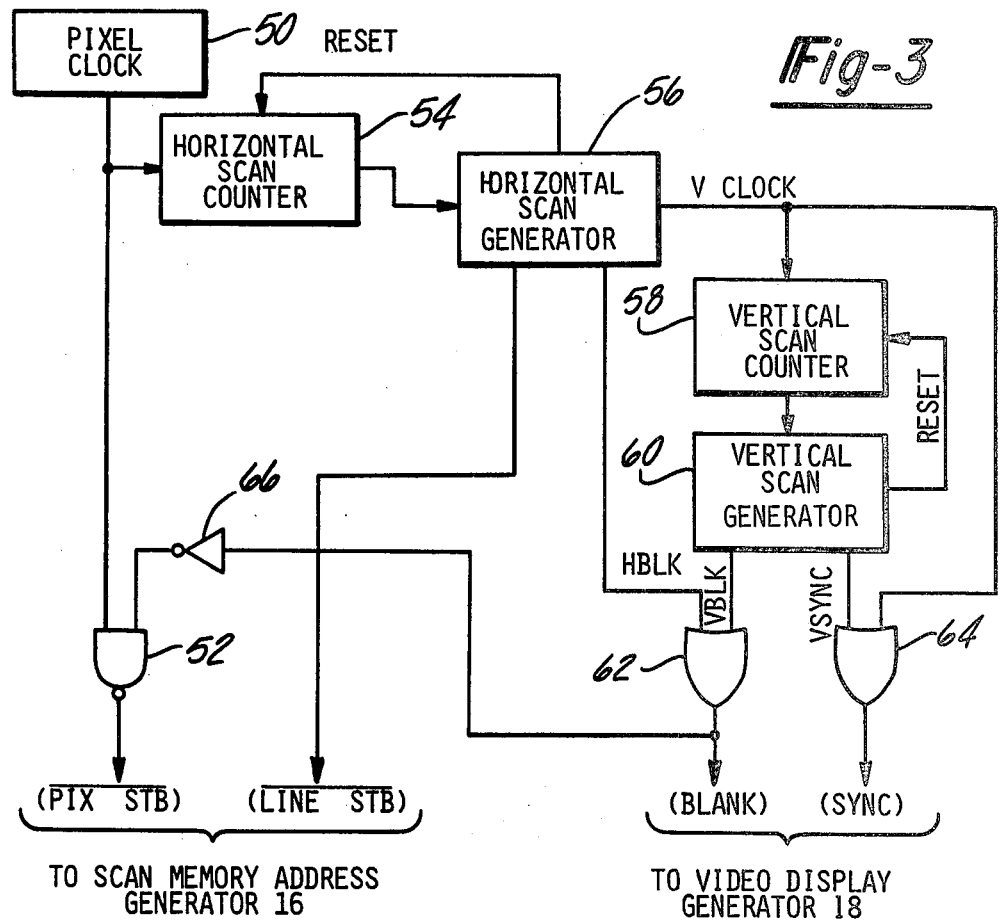

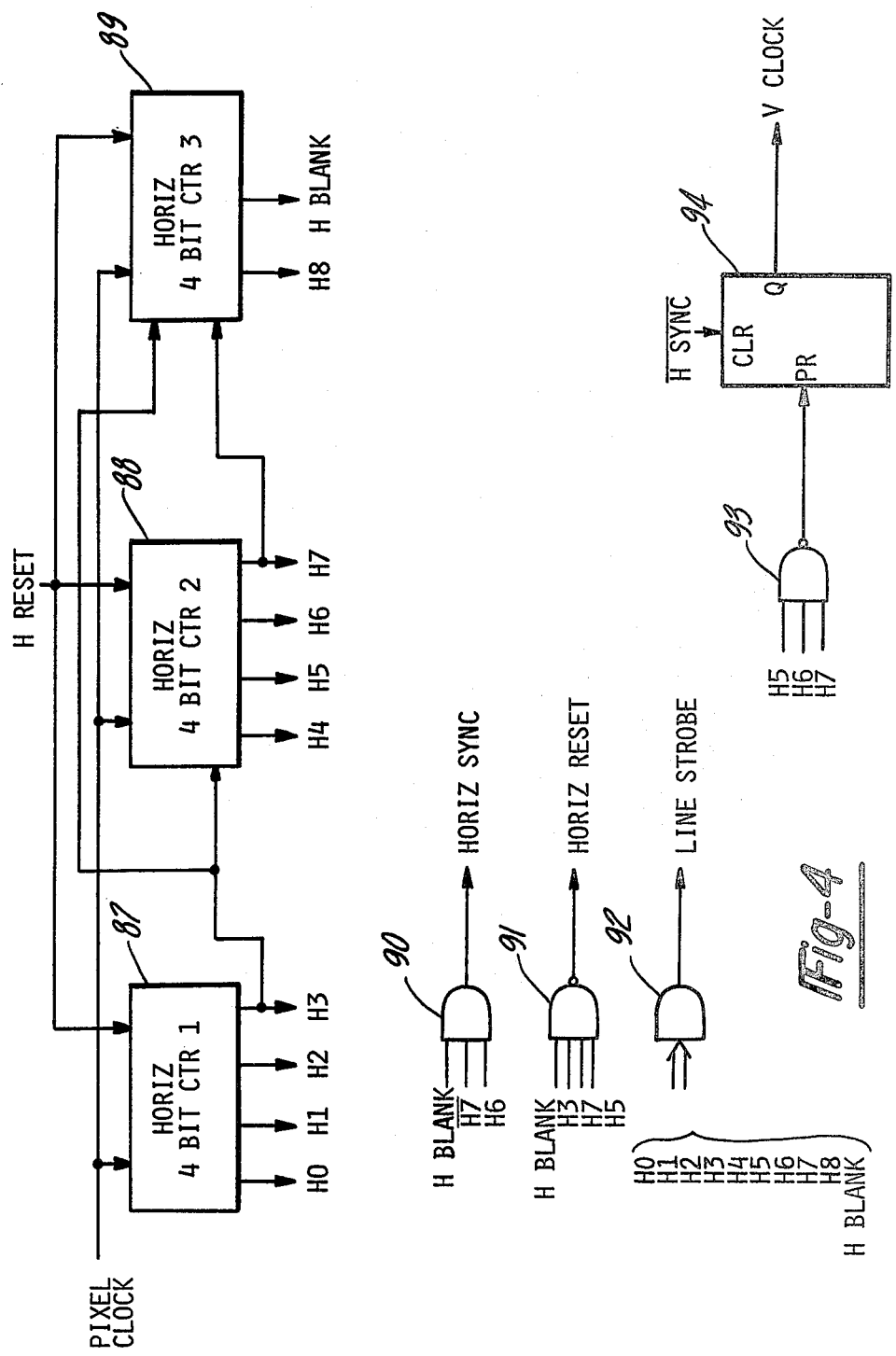

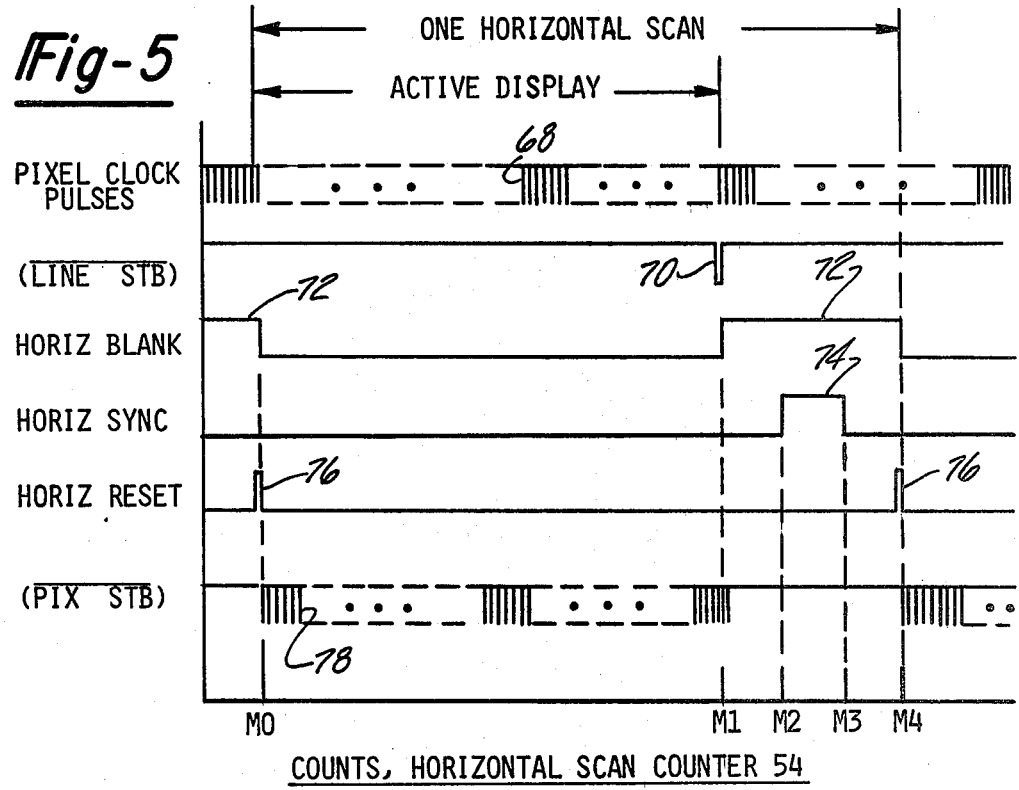
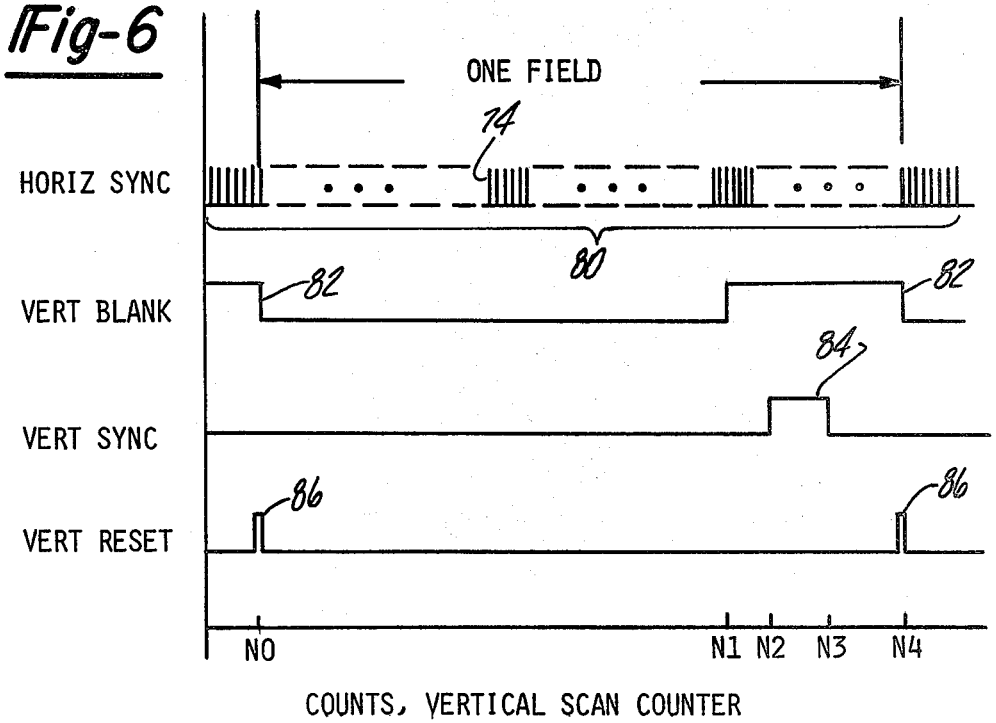

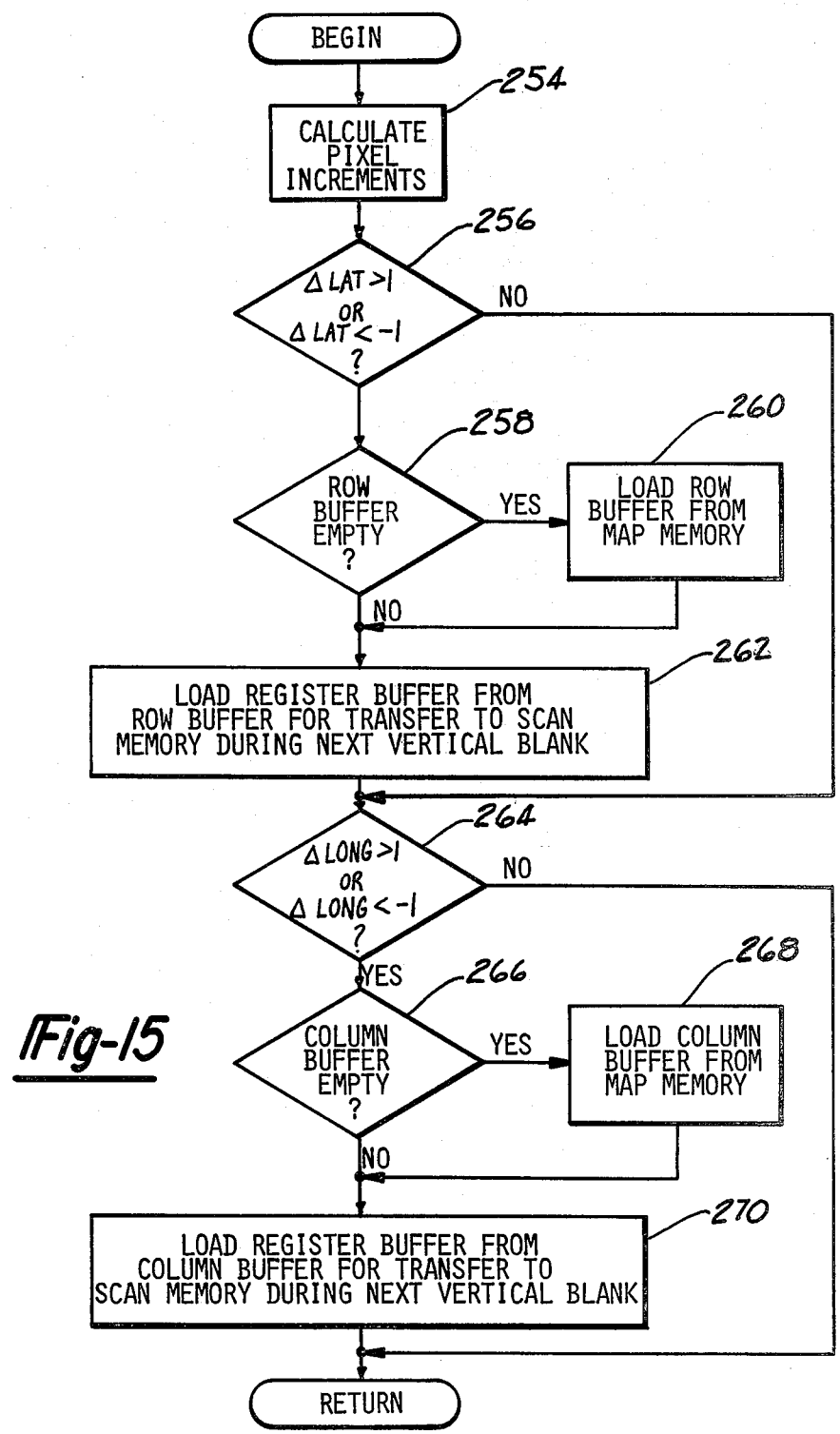

MOVING MAP DISPLAY

CROSS REFERENCE

The disclosed invention is related to the commonly assigned co-pending application Ser. No. 331,723 filed Dec. 17, 1981 entitled Address Generator filed concurrently herewith.

BACKGROUND OF THE INVENTION

1. Field of the Invention

The invention is related to a moving map display and in particular to a moving map display in which the map data is electronically stored and the desired portion of the map is displayed on a cathode ray tube.

2. Prior Art

It is often desirable to provide to the operator of a vehicle a map showing the topographical features of the terrain immediately surrounding the vehicle. This is particularly true for the pilot of an aircraft where the terrain may be obscured by cloud cover or darkness. Some of the advanced radar systems are capable of generating an image of the terrain immediately surrounding the aircraft, however the generated map contains only limited information, and the radar image must be correlated with a navigational map in order to provide the pilot with the necessary information, such as labels identifying pertinent topographical features and recognizable landmarks. Alternatively, map displays have been developed in which the map is stored on one or more positive microphotographic transparencies such as taught in German Pat. No. 26 25 597 or by Richardson et al in U.S. Pat. No. 3,652,836. These microphotographic transparencies are projected in the operators field of view and are capable of being moved in two orthogonal directions to keep the vehicles coordinates in the center of the displayed portion of the map. In some of these systems, the transparency or even the whole projector system may be rotated so that the top of the displayed map coincides with the heading of the vehicle. Evans et al in U.S. Pat. No. 4,179,693 discloses an autonomous check point navigational system for an airborne vehicle in which flight path is periodically checked and corrected by comparing the position of terrain features on a detected map against the terrain features of an associated electronically stored reference map. The system electronically stores a plurality of reference maps, one for each check point and the addresses of the detected terrain features are modified to correct for an angular misalignment between the sensed map and the reference map. The disclosed electronic moving map display overcomes the disadvantages of the projected map and check point navigational systems and provides for increased versatility as shall be described hereinafter.

BRIEF DESCRIPTION OF THE FIGURES

FIG. 3 is a block diagram of the Scan Timing Generator.

FIG. 4 is a circuit diagram of the Horizontal Scan timer.

FIG. 5 shows the wave forms of the signals generated by the Horizontal Scan Timer.

FIG. 6 shows the wave forms of the signals generated by the Vertical Scan Timer.

FIG. 15 is the subroutine flow diagram for determining if the map in the Scan memory needs to be updated.

SUMMARY OF THE INVENTION

Figure 1:
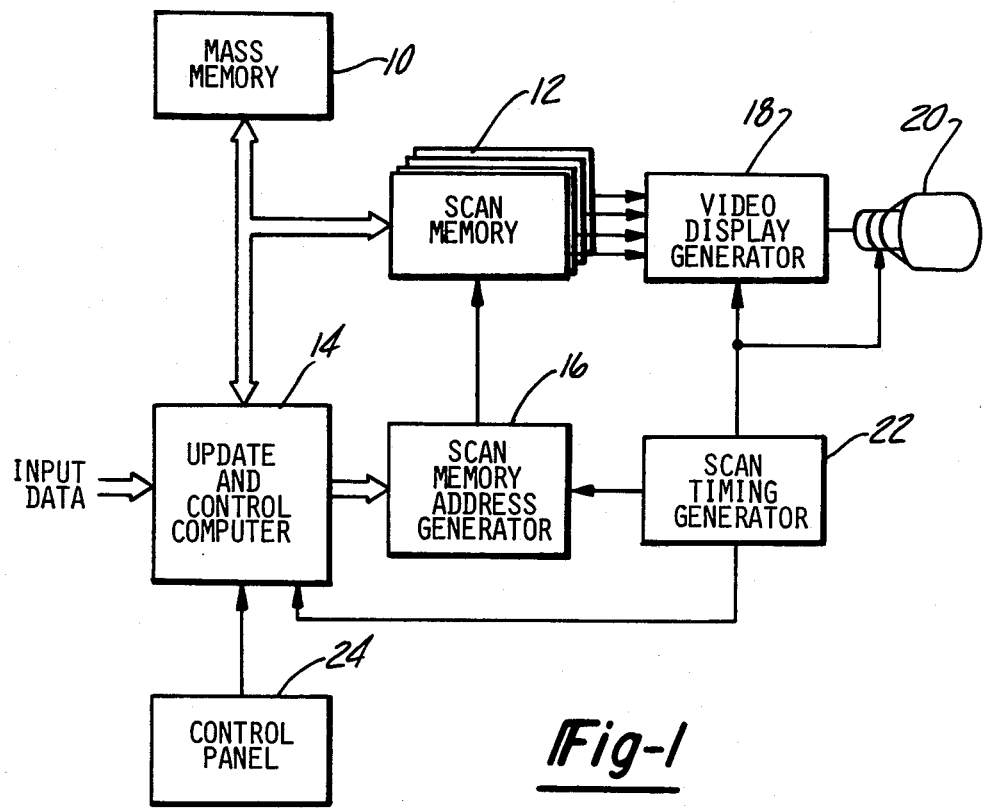
FIG. 1 is a block diagram of the electronic moving map display.

The disclosed electronic moving map display presents to the operator of a vehicle a map indicative of the topographical features of the terrain immediately surrounding the vehicle. The movement of the displayed map is coordinated with the movement of the vehicle such that the position of the vehicle on the displayed map has a predetermined relationship with respect to the center of the displayed map.

The electronic moving map display comprises: a mass memory electronically storing color coded map data indicative of a complete map covering the terrain to be navigated by the vehicle; a scan memory for electronically storing digital map data indicative of a portion of the complete map, said portion covering the immediate area surrounding the vehicle and having a predetermined relationship with respect to the vehicles current position; an update and control computer including means responsive to said coordinate signals for periodically computing a desired map center indicative of the center of the portion of the map stored in the scan memory, means responsive to a change in said desired map center for generating update parameters for transferring map data from said mass memory to said scan memory to maintain said predetermined relationship between the portion of the map stored in the scan memory and the vehicle's coordinate position, and means responsive to said desired map center for generating scan parameters, including a starting address in said scan memory where a scan of said scan memory begins to generate a visual display of said portion of the complete map; means for generating horizontal and vertical synchronization signals; scan memory address generator means responsive to said update parameters for generating the addresses where said map data being transferred by said update and control computer is to be stored in said scan memory, said scan memory address generator means further responsive to said scan parameters and said horizontal and vertical synchronization signals for systematically generating addresses enabling said scan memory to output the digital map data in a predetermined sequential order; converter means for converting the digital map data output from said scan memory to analog map data; and display means responsive to said analog map data said horizontal and vertical synchronization signals for generating a visual map image corresponding to the portion of the map stored in said scan memory.

One advantage of the disclosed moving map display is that the portion of the map being displayed is electronically updated to maintain a desired relationship between the vehicles coordinates and the center of the displayed portion of the map. Another advantage of the disclosed moving map display is that the coordinates of the vehicle may correspond to the center of the displayed map or be offset a predetermined distance from the center of the displayed map in a direction opposite the vehicles heading. Yet another advantage of the disclosed moving map display is the map may be displayed in a north-up or heading up orientation. Still another advantage is that the magnification of the displayed portion of the map may be changed at the option of the vehicle's operator. Another advantage of the disclosed moving map display is that the operator may remove predetermined map information to declutter the displayed portion of the map. Still another advantage of the disclosed moving map display is the addresses for reading the map data out of the scan memory are calculated by a special purpose scan memory address generator freeing the update and control computer for other computations and for transferring map data to update the map stored in the scan memory. Yet another advantage of the disclosed moving map display is that the scan memory may be addressed by the scan memory address generator along lines normal to the vehicles heading thereby rotating the displayed portion of the map so that the vehicle heading is towards the top of the map. A still further advantage is that the scan memory may be updated with new map data at the end of each frame displayed on the cathode ray tube.

These and other advantages of the disclosed electronic moving map display will become apparent from a detailed reading of the specification in conjunction with the appended drawings.

DETAILED DESCRIPTION OF THE INVENTION

A block diagram of the electronically stored moving map display is shown in FIG. 1. The display comprises a Mass Memory 10 storing digital image data representative of the area over which the vehicle is to be navigated. The Mass Memory 10 may be a bubble, a magnetic disc, an optical disc, or any other type of memory having a multi-megabit storage capability. Although this image data may be stored in the Mass Memory 10 on a (picture element-by-picture element) pixel-by-pixel basis, it is preferred that the data be stored using any of the well known data compression techniques. Compression techniques reduce the quantity of image data that needs to be stored for any given area thereby keeping the size of the Mass Memory 10 within reasonable limits for almost all intended applications. The display also includes a Scan Memory 12 storing a segment or portions of the image data stored in the Mass Memory 10. The image data stored in the Scan Memory 12 represents the area immediately surrounding the vehicle which is to be displayed.

The data stored in the Scan Memory 12 is systematically updated with the movement of the vehicle under the control of an Update and Control Computer 14 and in cooperation with a Scan Memory Address Generator 16. The Scan Memory Address Generator 16 under the control of the Update and Control Computer 14 also generates the addresses of the storage elements in the Scan Memory 12 where the individual bits of map data called "pixels" are stored in synchronization with the scan signals generated by a Map Display 20. A Video Display Generator 18 converts the digital image data received from the Scan Memory 12 to analog color signals for driving the Map Display 20 illustrated as a multi-color cathode ray tube. A Scan Timing Generator 22 generates various timing signals which are transmitted to the Update and Control Computer 14, the Scan Memory Address Generator 16, the Video Display Generator 18 and Map Display 20 to synchronize the extraction of the data from the Scan Memory 12 with the generated vertical and horizontal scan signals for the Map Display's cathode ray tube. The Scan Timing Generator 22 also generates the retrace blanking signals for Map Display's cathode ray tube.

The Update and Control Computer 14 receives input data, such as the vehicle's coordinates, and vehicle's heading from external sources and sensors (not shown). It also receives inputs from a Control Panel 24 which controls the moving map display's mode of operation. The controls on the Control Panel 24 may include a selector which controls whether the display on the Map Display 20 will be a North-Up or a Heading-Up display. In a North-Up display, the direction, "north", is always towards the top of the displayed map. Conversely, in a Heading-Up display, the heading or direction of motion of the vehicle is always towards the top of the displayed map. The Control Panel 24 may also include a Center De-center Selector. In the Center mode, the map is moved such that the position of the vehicle is maintained in the center of the displayed portion of the map. In the De-centered mode, the map is displaced such that the position of the vehicle is offset from the center of the map in a direction opposite the vehicle's heading. The offset is predetermined and may be varied to suit a particular application. Typically, the position of the vehicle will be offset so that three fourths ($\frac{3}{4}$) of the displayed map is in front of the vehicle. The Control Panel 24 may also include a zoom control for changing the size of the area displayed on the Map Display 20.

The operation of the moving map display is as follows: After the digital data representing the entire map is entered into the Mass Memory 10, the vehicle's coordinates and vehicle's heading are entered into the Update and Control Computer 14. The Update and Control Computer 14 will then, upon appropriate instructions, calculate the location of the image data surrounding the desired map center in the Mass Memory 10 and transfer that portion of the image data into the Scan Memory 12. During full load of the Scan Memory 12, the Scan Memory Address Generator generates Scan Memory addresses. Depending on the inputs from the Control Panel 24, the Scan Memory Address Generator 16 under the control of the Update and Control Computer 14, and in synchronization with the signals from the Scan Timing Generator 22 sequentially generates the addresses of image data stored in the Scan Memory 12 which are to be displayed. The addressed image data is transferred from the Scan Memory 12 to the Video Display Generator 18 where it is converted from digital data to analog signals. The analog signals along with the scan and blanking signals are transmitted to the Map Display 20 to generate a visual map image. The display may also include an image of the vehicle showing its location relative to the portion of the map being displayed.

Figure 2:
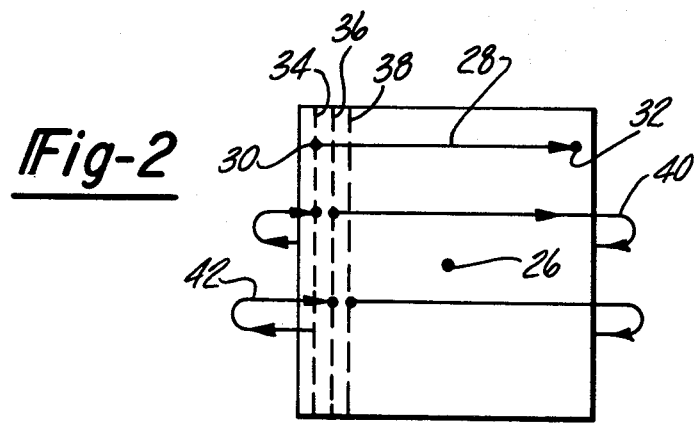
FIG. 2 illustrates the wrap-around technique used to store the image data in the Scan Memory.

As the vehicle moves, the image data in the Scan Memory 12 is periodically updated between picture fields with new image data from the Map Memory 10. The Scan Memory 12 is updated during the vertical blanking signal one row or column at a time and the Display 20 is refreshed by reading out the data stored in the Scan memory 12 at an angle, not necessarily by row or column. FIG. 2 shows a plan view of the Scan Memory in which the image data is stored on a pixel-by-pixel basis in parallel rows in columns. In the configuration illustrated in FIG. 2 the system is in the North-Up and Centered Modes, therefore the coordinates of the vehicle, represented by storage element 26 are the desired center of the map stored in the Scan Memory 12. A horizontal scan line, represented by arrow 28, starts with a pixel 30 at the upper-left corner of Scan Memory 12 and ends with pixel 32 on the right edge of the memory.

As the vehicle moves, for example, to the right, it is necessary to move the map in the same direction, otherwise the vehicle will move off of the displayed portion of the map. To move the map to the right, one may displace all of the image data stored in the Scan Memory 12 to the left then add a new column of data at the right edge of the Scan Memory. The original image data in column 32 at the left edge of the memory would be discarded.

Rather than shift all of the data in the Scan Memory 12, it is much easier and quicker to replace only the image data in column 34 with the data representing the new column to be added. Simultaneously, the beginning of the scan of the Scan Memory 12 will be incremented by one pixel so that the scan lines represented by line 40 for the display will now start with pixels in column 36 and end with pixels in column 34.

As the vehicle continues to move towards the right, the image data in column 36 will be replaced with new image data from the Mass Memory 10 such that the horizontal scan lines would now begin with pixels in column 38 and end with pixels in column 36 as indicated by scan line 42. It is obvious that as the vehicle continues to be displaced towards the right, the point at which the scan begins will also be displaced a number of pixels corresponding to the displacement of the vehicle. This wrap-around scan technique is well known to those skilled in the art and further discussion as to how it is implemented is not necessary for an understanding of the invention.

Alternatively, if the vehicle is moving in a vertical direction towards the top or bottom of the map stored in the Scan Memory 12, the map would be updated on a row-by-row basis. For example, if the vehicle moves upward in a northerly direction a distance equal to the distance between to adjacent rows of image data, the length of the map would be increased in the direction of movement by adding to the Scan Memory 12 a new row of image data extracted from the Mass Memory 10. Again, rather than shifting all of the other data in the Scan Memory 12 down one row to permit the new image data to be inserted at the top of the Scan Memory, the new row of image data replaces the bottom row of image data which is no longer used. The address for the row storing the first horizontal scan is now indexed by one.

The adding of new rows and columns of image data to the Scan Memory is under the control of the Update and Control Computer 14 which is receiving information with regards to the vehicle's coordinates and heating from external sources. On the basis of the received data, the Update and Control Computer 14 computes when it is necessary to update the image content of the Scan Memory 12 so that a predetermined relationship between the position of the vehicle and the portion of the map stored in the Scan Memory 12 is maintained. The Update and Control Computer 14 pre-fetches from the Mass Memory 10, the blocks of map data containing the next several rows and columns required to update the Scan Memory 12 and stores this data in Column and Row Buffers. The Update and Control Computer 14 then transfers the appropriate row or column of map data to the Scan Memory 12 to the storage elements addressed by the Scan Memory Address Generator 16. The Update and Control Computer 14 then computes and stores the new X and Y Scan Memory starting addresses for the next field of map data to be displayed.

When the display system is in the Heading-Up display mode, the Update and Control Computer 14 will also generate incremental correction parameters (incremental x and y correction values) for the computation of the Scan Memory addresses in accordance with the angular heading of the vehicle. These incremental x and y correction values are utilized by the Scan Memory Address Generator 16 to compute the X and Y addresses for the map data required for each horizontal scan across the face of the cathode ray tube. The addresses are generated so that the image pixels extracted from the Scan Memory 12 are along a line normal to the vehicle's heading or direction of motion. This effectively causes the displayed map to be rotated so that the vehicle's direction of motion is always towards the top of the displayed portion of the map.

As previously described, the Mass Memory 10 is of conventional design having a multi-megabit capacity. This Mass Memory 10 may store image data covering an area many times that capable of being displayed at any one time on the Map Display 20. The Scan Memory 12 consists of at least three separate parallel memory planes. Each memory plane stores image data for one bit of a three (3) bit color code used in the generation of the map display.

The size of each plane of the Scan Memory 12 is determined by the number of (picture elements) pixels in the displayed image. For example, if the displayed image is a 512×512 pixel matrix, each plane of the scan memory may consist of 768×768 matrix of storage elements. This will permit complete rotation of the portion of the map to be displayed within the Scan Memory 12 without loss of image data during a Heading-Up display. More particularly, when the actual number of lines on the cathode ray tube are considered, the size of each plane in the Scan Memory may be reduced to a 704×704 element matrix.

A fourth plane may be added to the Scan Memory 12 which contains predetermined map information not included in the primary map. The advantage of including this information on a fourth plane is that it can be selectively removed from the displayed map whenever desired to declutter the displayed map. This fourth plane is controlled independently but in synchronization with the image information being extracted from the other three Scan Memory planes.

SCAN TIMING GENERATOR

The details of the Scan Timing Generator are shown in the block diagram of FIG. 3. A Pixel Clock 50 generates pixel clock pulses at a frequency corresponding to the rate at which the pixels are to be extracted from the Scan Memory 12 and displayed on the Map Display's cathode ray tube. The pixel clock pulses are received by a NAND-Gate 52 and a Horizontal Scan Counter 54. A Horizontal Scan Generator 56 monitors the number of pixel clock pulses counted by the Horizontal Scan Counter 54 and generates a line strobe (LINE STB) signal when the number of received pixel clock pulses is equal to the number of pixels in a complete horizontal line scan. The Horizontal Scan Generator 56 also generates a horizontal scan synchronization signal (HSYNC) a predetermined number of pixel clock pulses after the generation of the line strobe signal. The Horizontal Scan Generator 56 will further generate a horizontal video blanking (HBLK) signal for a predetermined period of time (number of pixel clock pulses) after the generation of the line address strobe signal. At the end of the blanking signal, the Horizontal Scan Generator 56 will also generate a reset signal clearing the Horizontal Scan Counter 54 to begin a new horizontal line scan across the face of the Map Display's cathode ray tube.

The horizontal synchronization signals (HSYNC) are counted in a Vertical Scan Counter 58. A Vertical Scan Generator 60 monitors the number of horizontal synchronization signals stored in the Vertical Scan Counter 58 and generates a vertical blanking signal (VBLK) when the number of horizontal synchronization signals is equal to the number of horizontal scan lines required for the map display. The vertical blanking signal will be generated for a period of time (number of horizontal synchronization signals) required for the electron beam to retrace to the top of the Map Display's cathode ray tube. At the end of the blanking signal, the Vertical Timing Generator 60 will generate a reset signal clearing the Vertical Scan Counter 58 to begin the timing sequence for the next frame to be displayed. During the generation of the vertical blanking signal, the Vertical Scan Generator 60 will also generate a vertical synchronization signal (VSYNC).

The horizontal and vertical blanking signals generated by the Horizontal and Vertical Scan Generators 56 and 60 respectively are received by an OR-Gate 62 which outputs a composite blanking (BLANK) signal to the Map Display 20 to turn off the electron gun in the cathode ray tube during both the horizontal and vertical retraces of the electron beam. The horizontal and vertical synchronization signals are received by an OR-Gate 64 where they are combined into a composite synchronization (SYNC) signal transmitted to the Map display 20. These combined synchronization signals synchronize the generation of the horizontal and vertical scan signals controlling the position of the cathode ray tube's electron beam in a conventional manner.

The composite blanking (BLANK) signal is inverted by an inverter 66 and the inverted blanking signal is applied to the other input of NAND-Gate 52. The inverted blanking signal enables NAND-Gate 52 at all times except during the periods when blanking signals are being generated. In the enabled state, the output of NAND-Gate 52 is a pixel strobe (PIX STB) signal.

The operation of the Scan Timing Generator 22 will be discussed with reference to the waveforms shown in FIGS. 5 and 6.

The Pixel Clock 50 continuously generates the pixel clock pulses as indicated by waveform 68 on FIG. 5. Upon sensing that the Horizontal Scan Counter 54 has counted the predetermined number of pixel clock pulses (M) the Horizontal Scan Counter will generate the line strobe (LINE STB) signal 70 and initiate the generation of the horizontal blanking signal 72. The Horizontal Scan Counter 54 will continue to count pixel clock pulses and the Horizontal Scan Generator 56 will generate a horizontal synchronization signal 74 when the number of counts stored in the Horizontal Scan Counter 54 is between the numbers $M_2$ and $M_3$ where $M_2$ is larger than $M_1$. Finally a reset signal 76 is generated when the number of counts in the Horizontal Scan Counter 54 reaches "$M_4$". The reset signal clears the Horizontal Scan Counter 54 initiating the timing sequence for the next horizontal scan line. The clearing of the Horizontal Scan Counter 54 also terminates the blanking signal 74 being transmitted to the Map Display 20.

NAND-Gate 52 is enabled during the active display period between $M_0$ and $M_1$ by the inverted blanking (BLANK) signal received from OR-Gate 62. The output of NAND-Gate 52 is a series of pixel strobe (PIX STB) signals 78 which are inverted pixel clock pulses generated between the blanking signals. These pixel strobe signals activate the Scan Memory Address Generator 16 to sequentially generate the addresses for the pixel elements in the Scan Memory 12 to be displayed, as shall be described hereinafter.

The horizontal synchronization pulses 74 are repetitively generated by the Horizontal Scan Generator 56 as indicated by the waveform 80 on FIG. 6. The individual horizontal synchronization pulses 74 are counted by the Vertical Scan Counter 58. After a predetermined number, $N_1$, horizontal synchronization pulses 74 are received, the Vertical Scan Generator 60 initiates the generation of a vertical blanking signal 82. The number of counts $N_1$ is equal to the number of horizontal scan lines of the map display. The Vertical Scan Counter 58 continues to count the horizontal synchronization pulses 74 and the Vertical Scan Generator 60 generates a vertical synchronization signal 84 when the number of counts is between $N_2$ and $N_3$ where $N_2$ is greater than $N_1$. A vertical reset signal 86 is generated when count in the Vertical Scan Counter 58 reaches a number $N_4$. The vertical reset signal clears the Vertical Scan Counter 58 for the beginning of a new picture field. The clearing of the Vertical Scan Counter also terminates the vertical blanking signal 82.

A detailed circuit diagram of the Horizontal Scan Counter 54 and Horizontal Scan Generator are shown in FIG. 4.

The Horizontal Scan Generator 56 consists of three 4-bit Binary counters 87, 88, 89 Clock pulses from a Pixel Clock 50 are processed to provide Horizontal Sync, Horizontal Blank, Horizontal Reset, Line Strobe and vertical Clock signals.

The operation of the Horizontal Video Scan Generator 56 is as follows: The Horizontal Blank (H Blank) signal is initiated when the Pixel Clock 50 generates the 512th clock signal at the output of Counter 89 as indicated at Mi on FIG 5. The Horizontal Blank signal provides horizontal blanking for the Map Display 20. The Horizontal Sync signal is generated from the ANDing of the signals H Blank, H7 and H6 in AND Gate 90. The Horizontal Sync (H Sync) signal is symmetrically positioned within the Horizontal Blank signal and is initialized by the count of 576 and continues until count 639. These counts correspond to difference between M2 and M3 respectively as shown in FIG. 5. The Horizontal Reset (H Reset) signal is generated from ANDing the signals H Blank with H3, H7 and H5 in AND Gate 91. The Horizontal Reset signal resets each counter terminating a complete line scan at a count of 703. This count represents M4 in FIG. 5.

The Line Strobe (LINE STB) signal is generated by ANDing of the signals H0 through H8 and H blank through AND Gate 92 and occurs at a count of 512 and is used by the Scan Memory Address Generator for intializing its registers for the next scan line.

The Vertical Clock signal is generated from Flip flop 94 whose Preset Input is derived from the signals H5, H6, and H7 through NAND Gate 93 and whose Clear Input is the signal H Synch. This Vertical clock signal is utilized by Vertical Scan Counter 58 as its main input clock signal.

The circuits for the Vertical Scan Counter 58 and Vertical Scan Generator 60 are similar to the Horizontal Scan Counter 56 and Horizontal Scan Generator 56 illustrated in FIG. 4 and therefore a detailed discussion is unnecessary for an understanding of its structure and operation.

SCAN MEMORY ADDRESS GENERATOR

Figure 7:
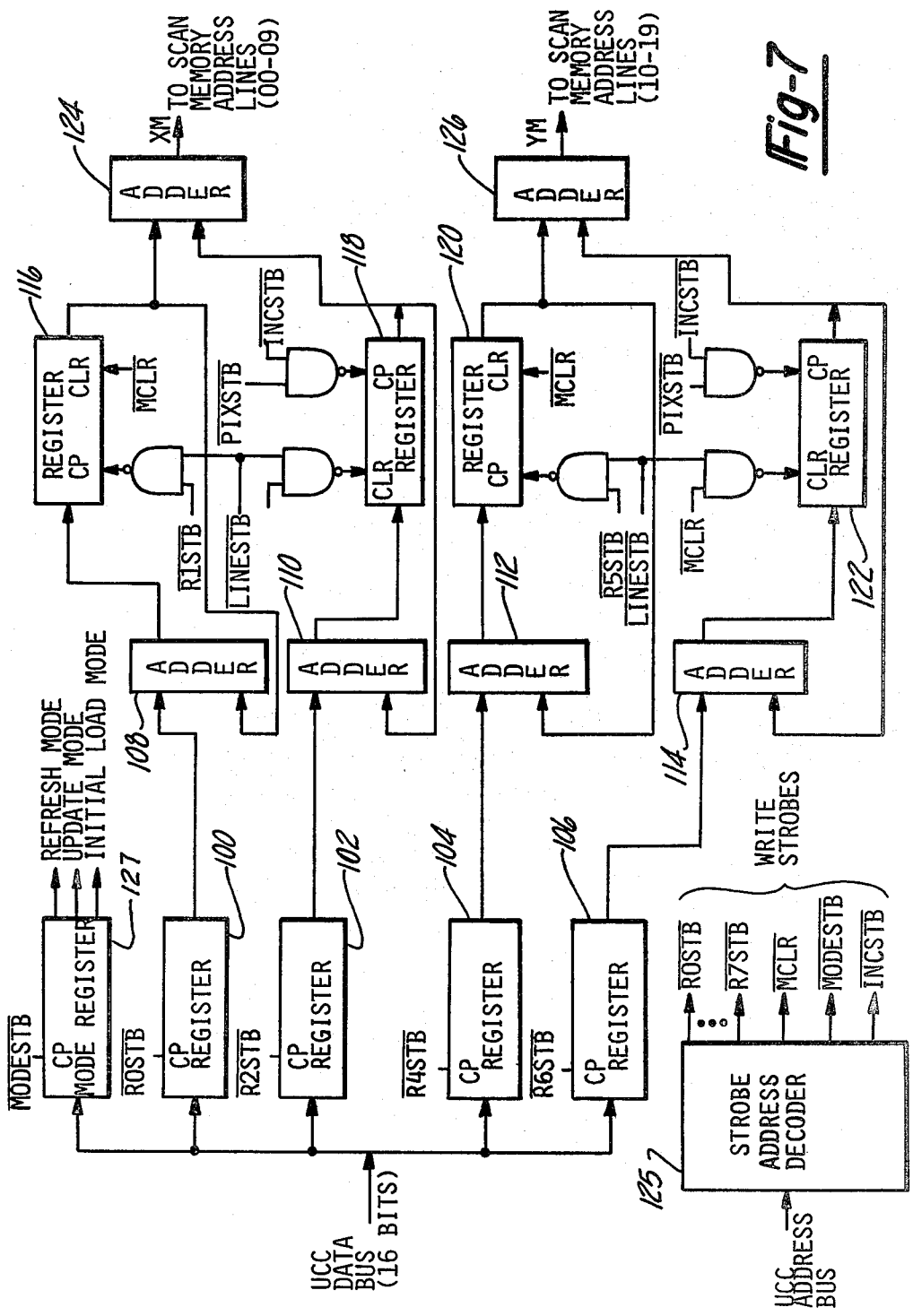
FIG. 7 is a circuit diagram of the Scan memory Address Generator.

A schematic of the Scan Memory Address Generator 16 is shown in FIG. 7. The details and operation of the Scan Memory Address Generator 16 are fully discussed in copending patent application, Ser. No. 331,723, filed Dec. 17, 1981 which is incorporated herein by reference. Briefly, the Scan Memory Address Generator 16 comprises four input registers 100, 102, 104 and 106. Registers 100 and 104 receive, respectively, the starting "X" and "Y" addresses directly from the Update and Control Computer 14. Registers 102 and 106 respectively receive the incremental correction values for generating the X and Y addresses when the system is in either the heading-up or north-up mode of operation.

The output of Register 100 is connected to the input of a Sum Register 116 through an Adder 108. The output of Sum Register 116 is connected to an input of Adder 108 and an input of Adder 124. In a like manner, the output of Register 102 is connected to the input of a Sum Register 118 through an Adder 110. The output of Register 118 is connected to an input an Adder 110 and the other input to Adder 124. The output of Adder 124 is the X address.

Correspondingly, the outputs of Registers 104 and 106 are connected to Registers 120 and 122, respectively, through Adders 112 and 114. The outputs of Registers 120 and 122 are connected back to the inputs of Adders 112 and 114, respectively, and to the inputs of Adder 126. The output of Adder 126 is the Y address.

The ten most significant bits of Adders 124 and 126 are connected to the address lines of the Scan Memory 12 as the X and Y addresses for the storage elements during initial loading, updating the Scan Memory 12 or refreshing the Map Display 20.

A Strobe Address Decoder 125 generates a series of strobe signals in response to predetermined addresses appearing on the address bus of the Update and Control Computer 14. These strobe signals activate the various Registers in the Scan Memory Address Generator as indicated. The Mode Registers 127 generates mode signals indicative of the operational mode of the Scan Memory Address Generator 16.

The operation of the Scan Memory Address Generator 16 is as follows: The Strobe Address Decoder 125 generates register strobe signals R0STB, R1STB R2STB R4STB R5STB R6STB, INCSTB, and MODE STB plus a master clear strobe signal MCLR in response to predetermined control addresses being present on the Update and Control Computer's address bus, thereby coordinating the operation of the Scan Memory Address Generator 16 with the operation of the Update and Control Computer 14.

In order to initially transfer the map data from the Mass Memory 10 to the Scan Memory 12, the Update and Control Computer 14 provides initialization parameters to the Scan Memory Address Generator 16 so as to operate it in the initial load mode. Map data is transferred to the Scan Memory in columns of data blocks of a predetermined size. For example each block of data may contain a $32 \times 32$ matrix of map data bits. A master clear (MCLR) initiates the initial load mode after the Address Generator has been strobed for the initial load (I) mode by the mode strobe. The start X address is loaded into Register 100 by the strobe signal R0STB and transferred to Register 116 in response to strobe signal R1STB. The start Y address having a value of 0 is loaded into Register 104 by the strobe signal R4STB and transferred into Register 120 by the strobe signal R5STB. The incremental value of 1.0 is loaded into Register 102 by the strobe signal R2STB. The incremental Y value of 0 is loaded into Register 106 by the strobe signal R6STB.

Once the Scan Memory Address Generator 16 is initialized by the Update and Control Computer 14 for the initial load mode, Registers 118 and 122 are clocked by the pixel strobe signals. The X address is initialized to be incremented so that the first row of 32 map data bits from the first block is loaded into the Scan Memory. The next row of map data bits is loaded by detecting modulo 32 at the output of Register 118. This detection causes Register 118 to be cleared by MCLR and Register 120 to be clocked by R5STB so as to increment the Y address by 1. This proceedure continues until modulo 32 is detected at the output of Register 118 and a number 1 larger than the number of storage elements in a column is detected at the output of Adder 126. This detection causes Registers 118 and 120 to be cleared and Registers 116 to be incremented by 32 which was loaded into Register 100 from the Update and Control Computer and transferred to Register 116 in response to R1STB. The addressing then again starts at the top of the Scan Memory and another column of blocks is loaded into the Scan Memory. This process continues until all of the required columns of blocks are loaded into the Scan Memory 12.

The operation of preparing the Scan Memory Address Generator for the "refresh mode" is initiated by a master clear strobe (MCLR) signal which clears Registers 116, 118, 120 and 122. The Update and Control Computer 14 places on the data bus the 16-bit value of the X start address. The register strobe signal R0STB will be generated and Register 100 will be enabled and the X start address will be stored. The content of Register 100 is added to the content of Register 116 in Adder 108. Since Register 116 was cleared by the master clear strobe (MCLR), the address at the output of Adder 108 is the X-axis start address. The X-axis start address is subsequently stored in Register 116 in response to the strobe signal R1STB. The output of Register 116 is added to the content of Register 118 in Adder 124. At this point in time the content of Register 118 is still zero as a result of the master clear strobe (MCLR), therefore the output of Adder 124 is the computer generated X-axis start address.

The Update and Control Computer will next place the 16 bit value of the Y-axis start address on the data bus. This value will be stored in Register 104 in response to the strobe signal (R4STB) and Register 120 in response to the strobe signal (R5STB). In a like manner, the output of Adder 126 will be the computer generated Y-axis start address.

The ten (10) most significant bits of Adders 124 and 126 are applied to the address lines of Scan Memory 12 and address the first storage element in the Scan Memory where the scan begins.

The Update and Control Computer will then sequentially place the incremental X values for the generation of the addresses along the scan lines into Registers 102 and 106 respectively in response to sequentially generated strobe signals R2STB and R6STB. The incremental Y values are placed respectively in Registers 100 and 104 in response to sequentially generated strobe signals RØSTB and R4STB.

The generation of the sequential address along a scan line will begin with the generation of the pixel strobe (PIXSTB) signals by the Scan Timing Generator 22 which respectively enable Registers 118 and 122. The Scan Timing Generator 22 will generate a number of pixel strobe signals equal to the number of picture elements to be displayed along each horizontal scan line of the Display Device 20. For example if there are 512 pixels along each horizonal line of the Display Device 20, the Scan Timing Generator will generate 512 consecutive pixel strobe signals. Each pixel strobe signal will add the content of Register 102 to the content of Register 118. Likewise each pixel strobe signal will add the content of Register 106 to the content of Register 122.

The content of Registers 116 and 118 are added in Adder 124 to generate a new X-axis address in response to each pixel strobe signal. In a like manner, the content of Registers 120 and 122 are added in Adder 126 to generate a new Y-axis address in response to each pixel strobe signal. After the Scan Timing Generator 22 generates the predetermined number of pixel strobe signals, it generates the line strobe (LINESTB) signal. The line strobe signal clocks Registers 116 and 120 and clears Registers 118 and 122. The strobing of Register 116 causes it to store the sum of its prior content plus the incremental Y value stored in Register 100. In a like manner, the strobing of Register 120 cause it to store the sum of the content of Register 120 plus the incremental Y value stored in Register 104.

Since Registers 118 and 122 were cleared by the line strobe signal, the output of Adders 124 and 126 are the new starting X and Y addresses for the next sequential scan line. The Scan Timing Generator 22 will again generate a series of pixel strobe signals equal to the number of pixels in a scan line. Adders 124 will sum the content of Registers 116 and 118. Likewise Adder 126 will sum the content of Registers 120 and 122. This process will continue until the X and Y addresses for each pixel in the video field of the Display Device 20 is generated.

The Update and Control Computer 14 will update, if required, the image data content of the Scan Memory 12 with new data from the Mass Memory 10 at the end of each field during the period when the Scan Timing Generator 22 is generating a vertical blanking signal for the Display Device. When the Scan Memory 12 needs to be updated, the Update and Control Computer will place the Scan Memory Address Generator 16 in the Update Mode and generate the starting X and Y axis addresses of the column or row in which the new data is to be added. The X-axis starting address will then be stored in Register 100 in response to the strobe signal RØSTB. Likewise the Y-axis starting address will be stored in Register 104 in response to the strobe signal R4STB. These starting address will then be transferred to Registers 116 and 120 in response to strobe signals R1STB and R5STB respectively.

Incremental values indicative of the difference between address locations is then stored in Registers 102 and 106 in response to strobe signals R2STB and R4STB. For a row update, Register 102 and 106 are loaded with the values 1 and Ø respectively. This results in only the X addresses being incremented as the row of map data is loaded into the Scan Memory from the Update and Control Computer 14. For a column update Registers 102 and 106 are loaded with the values Ø and 1 respectively. This results in only the Y addresses being incremented as the column of map data is loaded into the Scan Memory.

For the row or column updates the Update and Control Computer accesses and stores in a sequential manner the map data in Register Buffers as obtained from the Row or Column Buffer which it previously obtained from the Mass Memory 10. The updating of a row or column, as previously described will take place during the vertical retrace of the Display Device 20 between successive fields of displayed map data.

When the Display Device 20 has a scan pattern comprising two interlaced fields of map data extracted from the Scan Memory, the Update and Control Computer in the Refresh Mode will generate an incremental Y values having 2 times the values generated for a non-interlaced scan. These larger values are entered into Registers 100 and 104 respectively. This will cause the Address generator to skip a scan line during the generation of the Y addresses. In this case the starting X any Y addresses for second field will be displaced one line from the starting address of the first frame.

In an alternate mode of operation, the size of the displayed image may be increased by a Zoom signal. The Zoom signal may have predetermined fixed values or may be variable between predetermined limits. In this case the incremental values generated by the Update and Control Computer 14 and stored in Registers 100, 102, 104 and 106 will be (1/Zoom) times the original incremental value. When the scan pattern of the Display Device comprises two interlaced frames, the Update Control Computer will generate the incremental Y values by the factor (2/Zoom). Correspondingly, the Update and Control Computer will generate the X and Y axis starting address compensating for the reduced area of the Scan Memory to be accessed by the generated addresses to maintain the relationship between the displayed image and the coordinate position of the vehicle.

VIDEO DISPLAY GENERATOR

Figure 8:
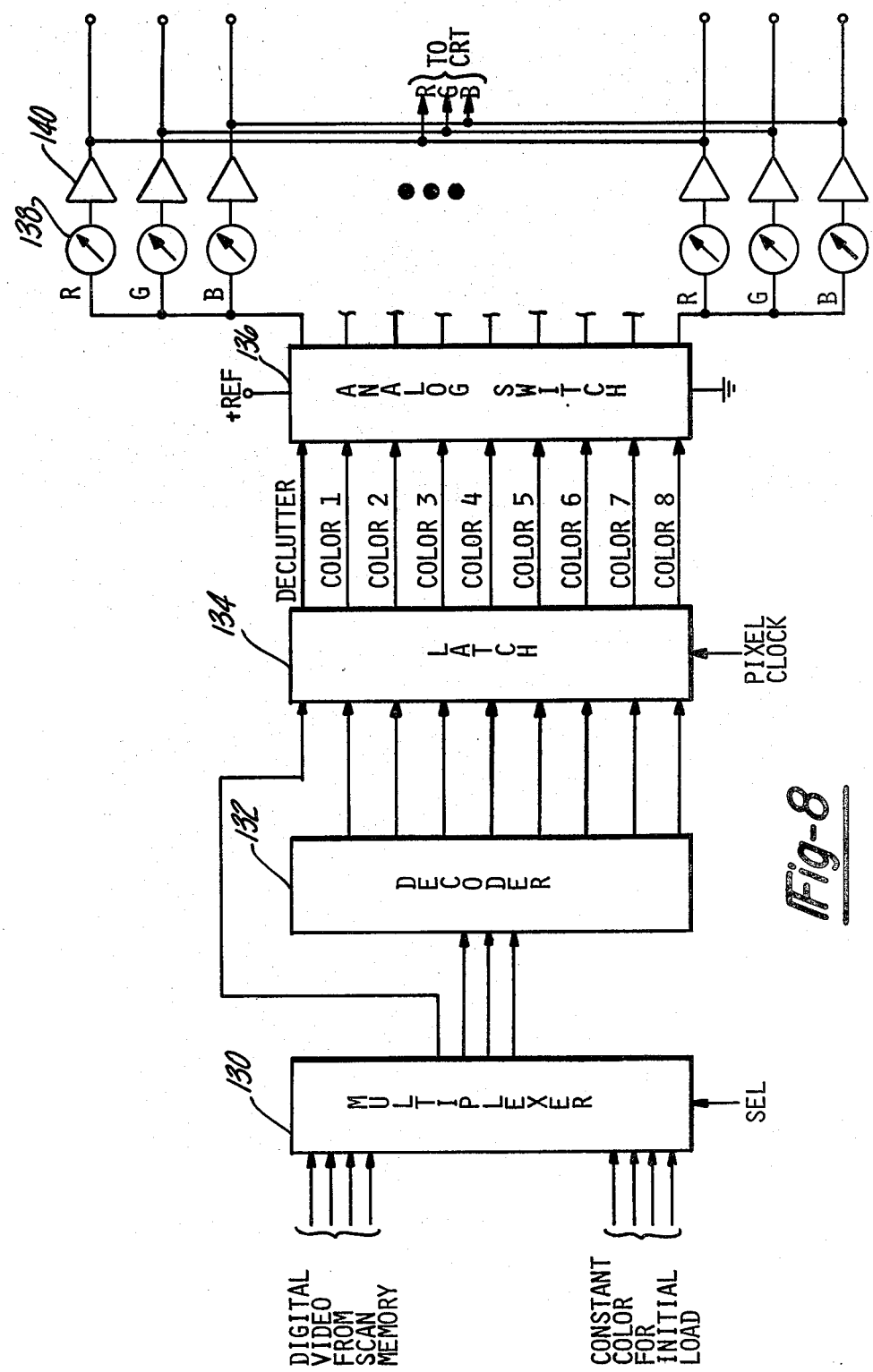
FIG. 8 is a block diagram of the Video Display Generator.

The details of Video Display Generator are shown on FIG. 8. Referring to FIG. 8, the digital data received from the separate memory planes of the Scan Memory 12 is a digital word which is received by a Multiplexer 130.

The Multiplexer 130 allows either the 4 bits from the Scan Memory 12 or 4 constant bits to enter a Decoder 132. The 4 constant bits are output from the Multiplexer 130 under the control of the SEL signal during the time when the Scan Memory 12 is being loaded. At all other times the data from the Scan Memory 12 is transmitted to the Decoder 132.

The Decoder 132 decodes the three bits of map data received from the three planes of the Scan Memory 12 into one of eight (8) different colors and outputs on 8 different lines signals indicative of the decoded color. The map data bit from the fourth plane of the Scan Memory 12 is used as a ninth (9th) declutter color and is sent directly to the Latch 134. A Latch 134 stores the nine decoded colors while the map data representing the next pixel is being received from the Scan memory 12 and decoded. Pixel clock signals clock the data into Latch 134.

An Analog Switch 136 receives the decoded color from the latch 134 and turns on one of its outputs at the level of REF and connects the remaining outputs to ground. Only one color is on for each pixel. Each color has is own set of red, green, and blue coefficients and are set by potentiometer 138. This allows each of the nine colors to be any possible combination of red, green and blue. The outputs from all the Red Amplifiers are are connected together and drive the red gun of the multi-color cathode ray tube. The Green Amplifiers 142 and Blue amplifiers 144 are likewise connected to drive the green and blue guns of the multi-color cathode ray tube.

UPDATE AND CONTROL COMPUTER

The Update and Control Computer 14 is a microprocessor based computer including a central processing unit (CPU), such as the Intel 8086 microprocessor manufactured by the Intel Corporation of Santa Clara, Calif., adequate memory for storage of the computer program, and the necessary peripheral components to interface the computer to the other subsystems of the moving map display system.

Figure 9:
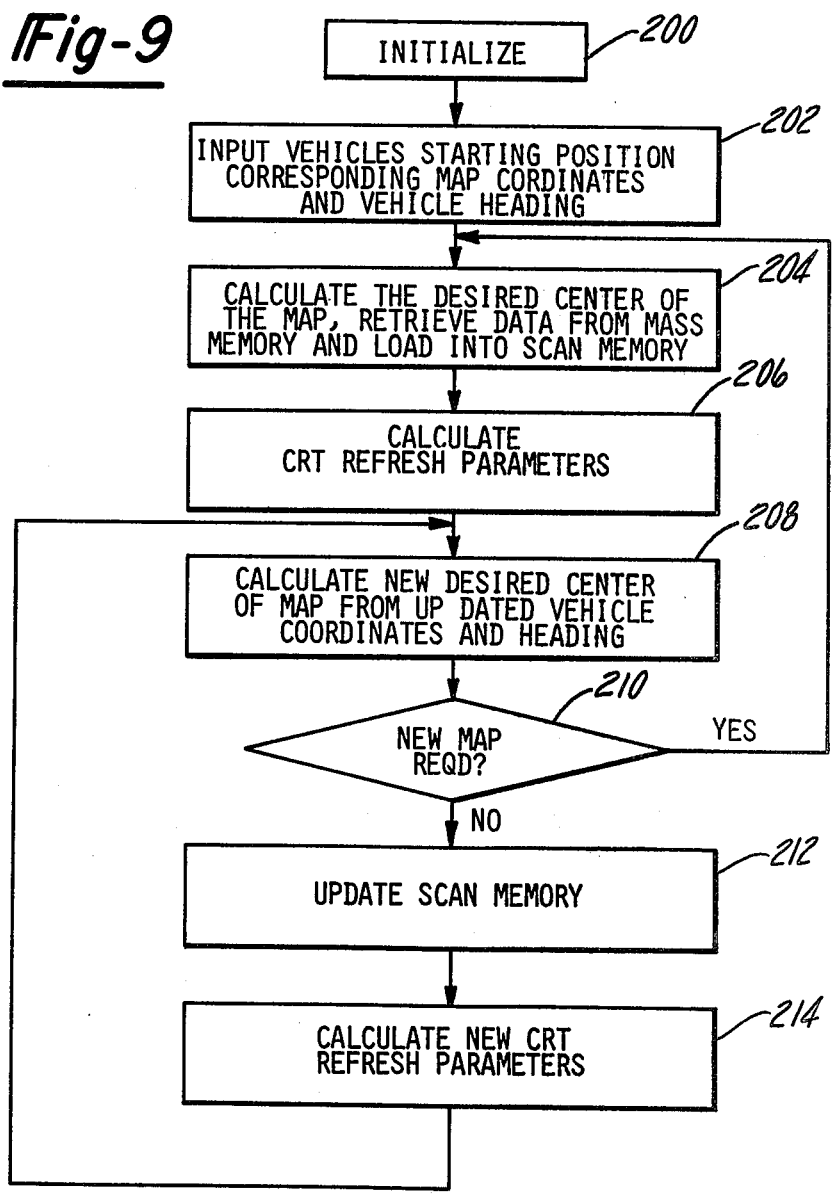
FIG. 9 is a flow diagram of the Update and Control Computer Executive Program.

The Executive Program for the Update and Control Computer 14 is illustrated in the flow diagram shown on FIG. 9. Referring now to FIG. 9 the Executive Program begins with the initialization of all software and hardware subsystems as indicated by block 200. After the initialization, the vehicle's starting map coordinates and vehicle heading are input into the computer from an external source, and/or the vehicles guidance system by block 202. The Update and Control Computer then calculates the desired center coordinates of the portion of the map to be stored in the Scan Memory 12 in accordance with the state of the Center De-center Selector on Control Panel 24. If the Selector is in the "Centered" position, the desired center of the map stored in the Scan Memory 12 is the same as the vehicles coordinates, otherwise the desired center of the map stored in the Scan Memory is calculated from the predetermined offset and the heading of the vehicle. After computing the desired center of the map to be stored in the Scan Memory 12, the location of the map data stored in the Mass Memory 10 to be transferred to the Scan Memory is calculated. This data is then retrieved from the Mass Memory 10 and loaded into the Scan Memory 12.

The Executive program then calls for the Update and Control Computer 14 to calculate the CRT refresh parameters for the Scan Memory Address Generator 16 as indicated by block 206. These parameters are used in the Scan Memory Address Generator to generate the sequential addresses of the data stored in the Scan Memory 12 to be displayed as previously described. The Executive Program then calls for the calculation of a new desired center of the map based on updated vehicle coordinates and heading as indicated by block 208. It then calls for comparing the new desired map center with the previous map center and decides whether or not a new map is required as indicated by decision block 210.

If the difference between the new desired map center and the previous map center exceeds predetermined update limits, the Executive Program returns to block 204, the location of the new map data in the Mass Memory 10 is calculated, and this new map data is loaded into the Scan Memory 12.

If the difference between the new desired center and previous center does not exceed the predetermined update limit, the Executive Program then calls a routine to handle the updating of the Scan Memory 12, block 212. This routine will be discussed in detail hereinafter. The CRT refresh parameters are calculated for the next frame of map data to be displayed on the cathode ray tube in block 214. Although the vehicle may not have traveled a distance sufficient to require that the data stored in the Scan Memory 12 be updated, the vehicle's heading may have changed sufficiently to change the CRT refresh parameters for the Scan Memory Address Generator 16. The newly calculated parameters for refresh are transferred to the Scan Memory Address Generator 16 on the next vertical blanking signal.

Figure 10:
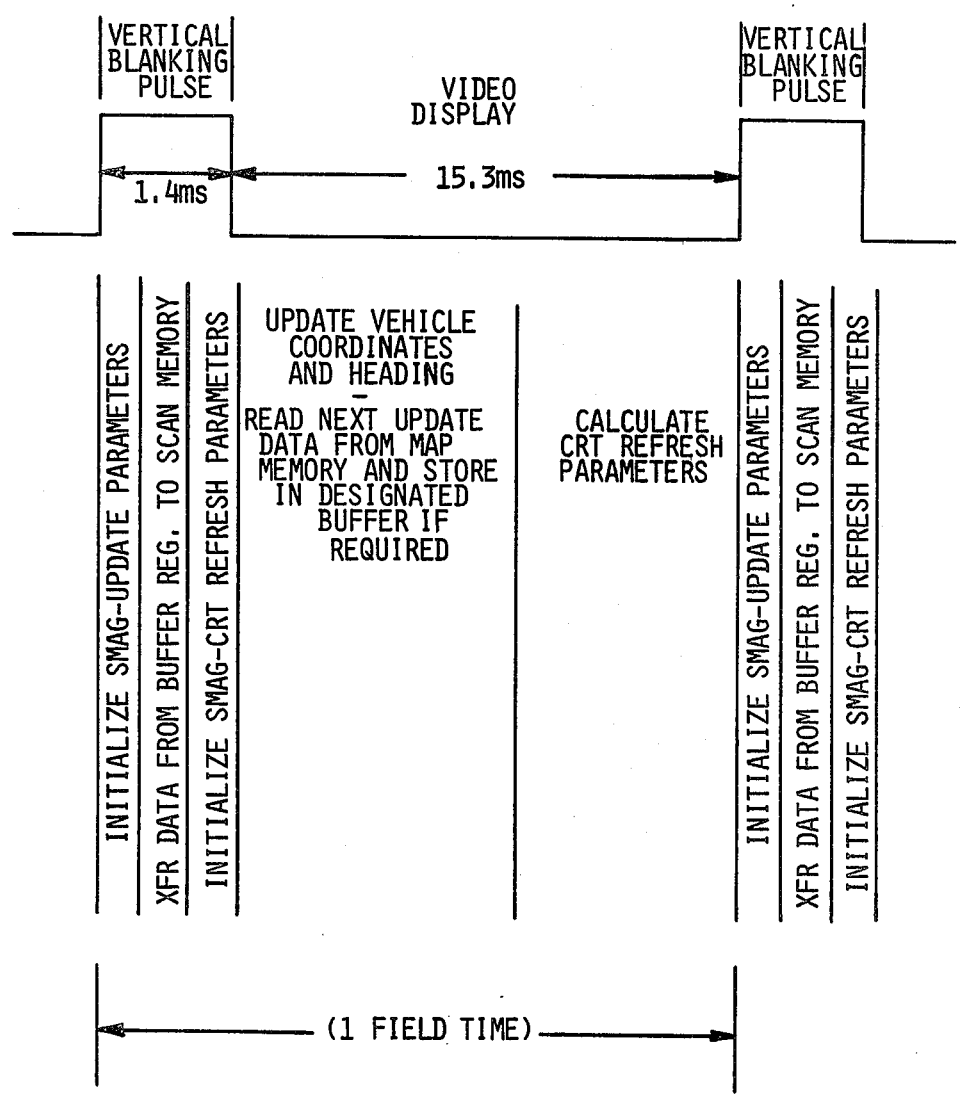
FIG. 10 illustrates the timing relationship between the various operations of the Update and Control Computer and the video display signals.

The timing sequence of data transfer to update the Scan Memory 12, the calculation of the CRT refresh parameters the initialization of the Scan Memory Address Generator, with respect to the vertical blanking signal being generated for the video display is illustrated on FIG. 10.

Figure 11:
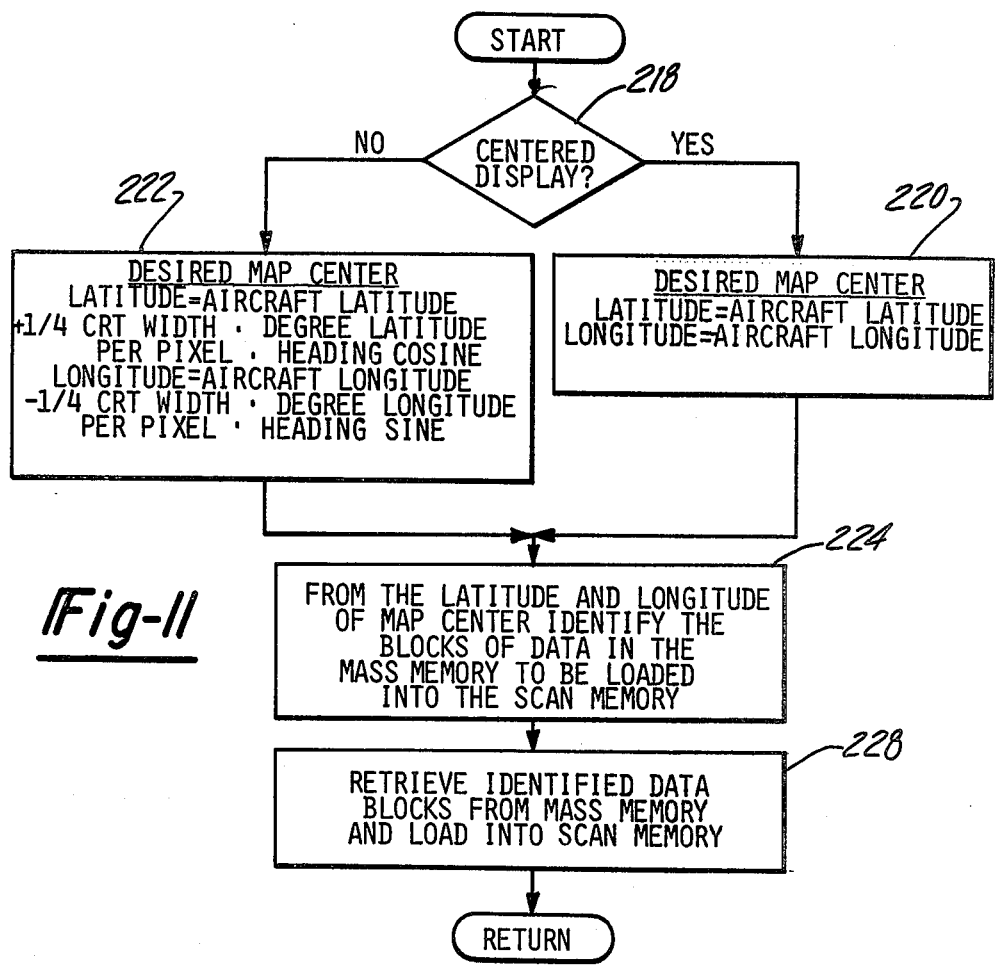
FIG. 11 is a subroutine flow diagram for the initial loading of the Scan Memory with data from the Map Memory.

The subroutine for calculating the desired map center and loading the Scan Memory with data from the Map Memory (block 204 in FIG. 9) is illustrated in FIG. 11. This subroutine first checks the state of the Center-Decenter selector, decision block 218. If the selector is in the "Centered" state, the desired map center is set equal to the vehicles coordinates, block 220. Otherwise the desired center of the map is calculated block 222. The latitude of the desired map center is set equal to the vehicles latitude plus ¼ the CRT pixel width times a conversion factor (degree latitude per pixel) times the cosine of the vehicles heading. The longitude of the desired map center is set equal to the longitude of the vehicle minus ¼ the CRT pixel width times the conversion factor (degree longitude per pixel) times the sine of the vehicles heading.

Figure 12:
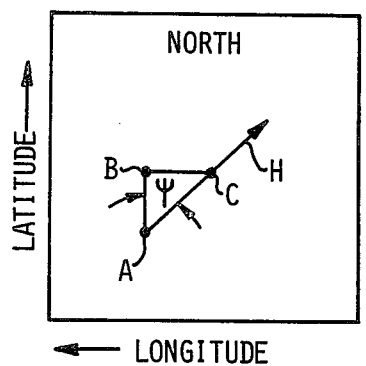
FIG. 12 is a pictorial illustration of how the map center is calculated for a De-centered Display.

The desired map center with the selector in the "Decentered" mode is pictorially illustrated in FIG. 12. In FIG. 12, north is at the top of the scan memory. The pixel A represents the actual location of the vehicle and the arrow H represents the direction of the vehicle heading. The angle $\Psi$ is measured from true north. The latitudinal offset of the desired map center C from the vehicles position A is represented by the line segment AB. The segment AC represents a distance equal to one fourth of the width of the CRT in pixel numbers times the latitude conversion factor in terms of degrees latitude per pixel. The segment AB represents the distance AC in terms of degrees latitude times the cos where $\Psi$ is the vehicles heading as measured clockwise from true north. Therefore the latitude of the desired map center is the actual latitude of the vehicle plus the latitudinal distance AB. In a like manner the longitude of the desired map center is equal to the vehicles actual longitude minus the longitudinal offset represented by the segment BC, where BC is equal to AC sine.

The subroutine then computes the location of the data in the Mass Memory 10 which is to be loaded into the Scan Memory from the latitude and longitude of the desired map as indicated by center block 224.

The parameters for loading the map data from the Mass Memory to the Scan Memory are then computed and loaded into the Scan Memory Address Generator 16 initializing it for the initial map data transfer.

The subroutine then calls for the loading of the identified map data into the Scan Memory 12 with the Scan Memory Address Generator computing the addresses where the data is to be stored, block 228. After the loading the Scan Memory, the subroutine returns to the Executive Program.

Figure 13:
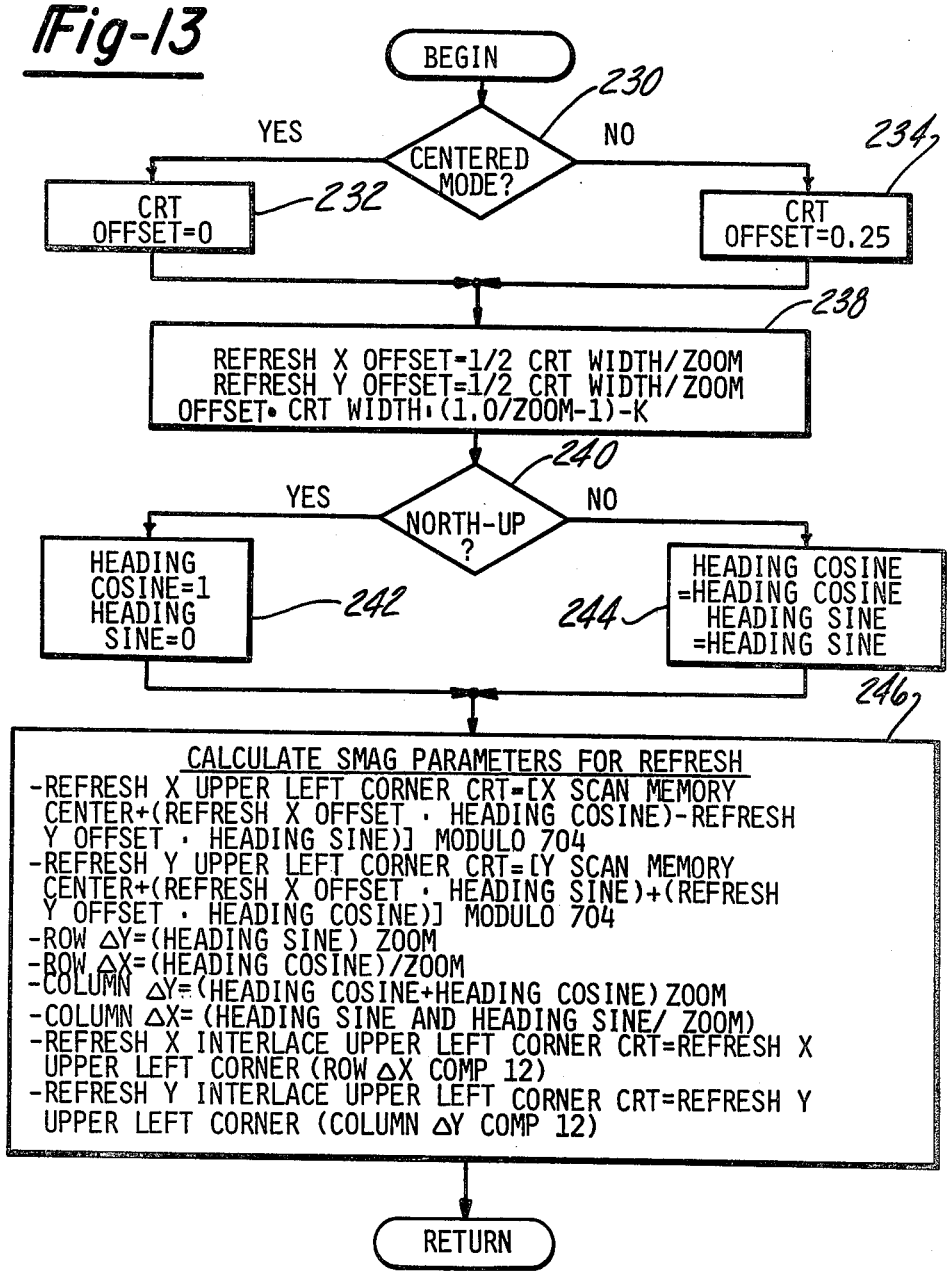
FIG. 13 is the subroutine flow diagram for calculating the Scan Memory Address Generator parameters for the refresh mode.

The subroutine for calculating the CRT refresh parameters for the Scan Memory Address Generator (block 206 of FIG. 9) is illustrated by the flow diagram shown in FIG. 13. This subroutine begins by first checking the state of the "Center-De-center" selector, decision block 230. In the "Centered" mode the "offset" is set to zero, block 232 otherwise "offset" is set to 0.25, block 234, which is the offset between the actual vehicle coordinates and the desired map center as calculated in the block 222 of the flow diagram illustrated on FIG. 12. The subroutine then calculates a refresh x offset and refresh y offset, block 238, where refresh x offset = ½ the width of the cathode ray tube in pixel lengths divided by the value of zoom signal generated by the zoom selector on the Control Panel 24. The zoom signal has a value variable between 1 and 3. The Refresh Y Offset is equal to ½ the width of the cathode ray tube (CRT) in pixels divided by the value of the zoom signal plus the offset times the width of the cathode ray tube times the value (1/zoom-1) minus a constant K. The constant K is equal to ½ the difference between the number of pixels along a horizontal scan line of a rectangular cathode ray tube and the number of horizontal scan lines of a complete picture frame. In a typical case where the horizontal scan line has 512 pixels and the number of horizontal scan lines in a complete picture frame is 480, the constant K would have a value of 16.

The subroutine then tests the North-Up, Heading-Up selector, decision block 240. If a North-Up display has been selected, the Heading Cosine is set to one (1) and the Heading Sine is set to zero (0) block 242. Otherwise the Heading Sine and Heading Cosine set equal to the values of the sine and cosine of the vehicles actual heading, block 244.

The subroutine then calculates the Scan Memory Refresh Parameters refreshing the cathode ray tube, block 246. The parameters calculated are the Refresh X Upper Left Corner CRT and Refresh Y Upper Left Corner CRT which are indicative of the X-start and Y-start addresses of the first pixel to be displayed in the generation of the map image on the cathode ray display tube. Where the map image is formed by two interlaced picture fields as is done in conventional commercial television, the subroutine will also generate a Refresh X Interlace Upper Left Corner CRT and a Refresh Y Interlace Upper Left Corner CRT which are indicative of the X and Y starting addresses for the first pixel on the interlacing picture field. After the first field has been displayed the converted Refresh X and Y Interlace parameters are placed into the registers 100 and 104 of the Scan Memory Address Generator 16 (FIG. 7) in place of Refresh X and Y Upper Left Corner CRT address to generate to the first field of the two interlacing fields.

The calculation of the Scan Memory Address Generator parameters also includes the calculation of the row and column incremental correction values which are required by the Scan Memory Address Generator 16 as previously discussed.

The Scan Memory Address Generator parameters are then converted to the 10 bit integer, 6 bit fraction format used by the Scan Memory Address Generator. Negative values are expressed as 2's compliment.

Figure 14:
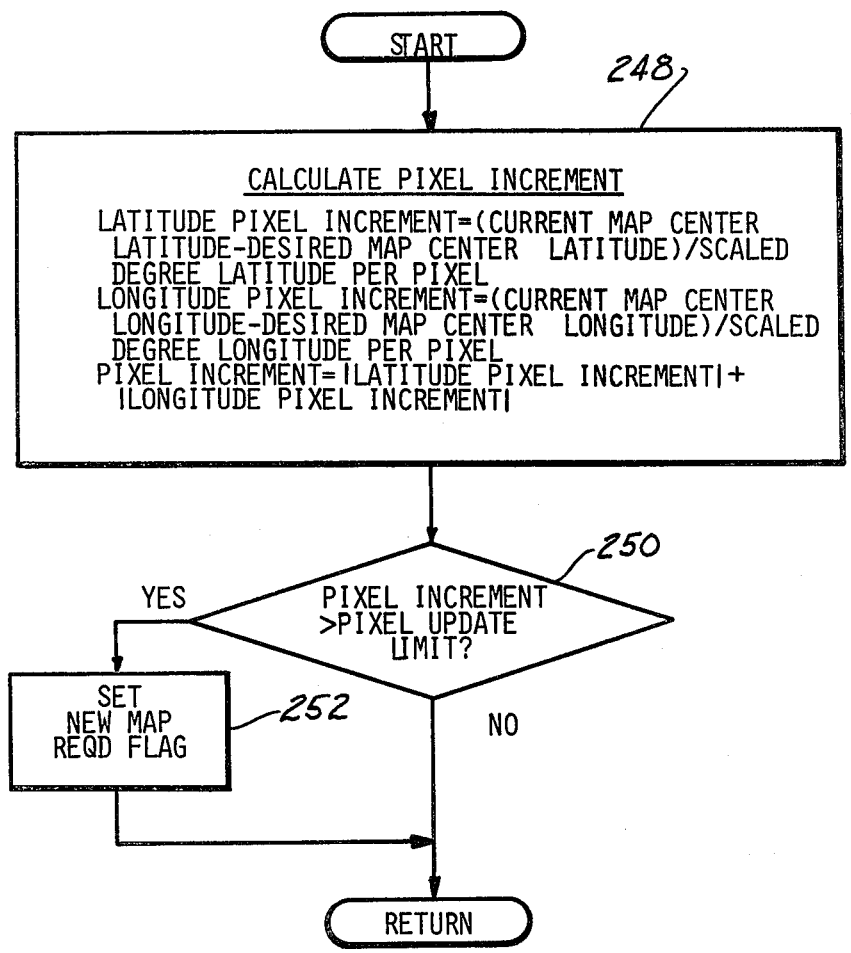
FIG. 14 is the subroutine flow diagram for determining if the map stored in the Scan memory can be successfully updated through a series of updates or whether an initial load is required.

The details of the subroutine for determining if a new map is required (decision block 210 of FIG. 9) are illustrated in FIG. 14. The subroutine begins by calculating the latitude pixel increment, the longitude pixel increment and the pixel increment which is the sum of the absolute values of the latitude and longitude pixel increments, block 248. The pixel increment is then compared with a predetermined pixel update limit, decision block 232. The pixel update limit is a predetermined number of pixels. If the pixel increment exceeds this value, the system is not capable of updating the Scan Memory map data during the vertical blanking signal to keep the actual center of the map current with the desired center of the map. If the pixel increment is greater than the Pixel Update Limit, the New Map Required Flag is set, block 252 and the subroutine exits to the Executive Program. Otherwise the subroutine exits to the Executive Program without setting the New Map Required Flag. Setting of the New Map Required Flag returns the Executive Program back to block 204 and the Scan Memory 12 is reloaded with new map data having the desired map center calculated from the vehicles updated coordinates and vehicle heading.

The subroutine for the update of the Scan memory (Block 212 of FIG. 9) is illustrated in the flow diagram shown on FIG. 15. During each pass through the major loop of the Executive Program, the Scan Memory Update subroutine is called to determine if an update of the Scan Memory 12 is required. If a scan memory update is required, this subroutine instructs the Update and Control Computer 14 to load the required row or column of pixels into a buffer for transfer to the Scan Memory 12 during the next vertical blanking signal.

The subroutine begins by computing the latitude and longitude pixel increments, block 254 (block 248 of FIG. 14). If the latitude pixel increment is greater than one (1) or less than minus one (−1) then one or more row updates are required, block 256. If many rows of columns are required it will take several calls of this subroutine to perform total update since only one row or column can be updated during each vertical blanking signal.

In decision block 258 a determinization is made of whether the row buffer is empty. As previously stated, the row buffer is periodically filled by extracting a new block of data from the Mass Memory 10. As in the prior example, the row buffer may store up to 32 rows of new map data. If the row buffer is empty, the buffer is filled with a new block map data from the Mass Memory 10 as indicated by block 260.

The required row of map data is then transferred from the row buffer to a register buffer as indicated by block 262. The data from the register buffer is then transferred to the Scan Memory 12 during the next vertical blanking signal.

If a column update is required indicated by a longitude increment being greater than one (1) or less than minus one (−1) a similar transfer of data into the Scan Memory 12 as shown in blocks 264 through 270.

It is submitted that subroutines for transferring identified data from one memory to another, such as designated by block 204 are well known in the art and need not be discussed in detail for an understanding of the invention.

Further it is not intended that the invention be limited to the specific embodiment discussed in the specification and illustrated in the accompanying drawings. It is submitted that persons skilled in the art can make changes to the structure and data processings methods disclosed herein without departing from the spirit of the invention disclosed and set forth in the appended claims.

We claim:

1. A moving map display for a vehicle wherein said vehicle includes means for generating coordinate signals indicative of the vehicle's current longitude and latitude coordinate position, and a heading signal indicative of the vehicle's direction of motion, said moving map display comprising:

mass memory means for electronically storing digital map data indicative of a complete map of the region to be traversed by said vehicle; scan memory means for electronically storing digital map data indicative of a portion of said complete map, said portion covering the immediate area surrounding the vehicle and having a predetermined relationship with respect to said vehicle's current coordinate position;

update and control computer means having adequate storage and computation means, said update and control computer means including means responsive to said coordinate and heading signals for periodically computing a desired map center indicative of the center of the portion of the map stored in said scan memory means, means responsive to a change in said desired map center for generating update parameters for transfering map data from said mass memory means to said scan memory means to maintain said predetermined relationship between the portion of the map stored in said scan memory means and the vehicle's coordinate position, and means responsive to said desired map center and said heading signals for generating refresh scan parameters, said scan parameters including a starting address in said scan memory means where a scan of said scan memory means is to begin to generate a visual display of said portion of the complete map and incremental values indicative of the vehicle's heading;

means for generating horizontal and vertical synchronization signals, horizontal and vertical blanking signals and pixel and line signals;

scan memory address generator means responsive to said update parameters and pixel signals for generating the addresses where said map data being transferred by said update and control computer means is to be stored in said scan memory means, said scan memory address generator means futher responsive to said refresh scan parameters, and said pixel and line signals for systematically generating addresses enabling said scan memory means to output the digital map data in a predetermined sequential order along parallel lines, the angular orientation of which are controlled by said incremental values;

converter means for converting the digital map data output from said scan memory means to analog map data; and display means responsive to said analog map data and said horizontal and vertical synchronizatin signals and said horizontal and vertical blanking signal for generating a visual map image corresponding to the portion of the map stored in said scan memory means.

2. The moving map display of claim 1 wherein said scan memory means comprises a plurality of storage elements arranged in a matrix of parallel rows and parallel columns and wherein each of said storage elements stores at least one bit of digital map data, and each storage location has a corresponding address, said scan memory stores parallel lines of latitudinal map data in storage locations disposed along said parallel rows and said longitudinal map data disposed along said parallel columns.

3. The moving map display of claim 2 wherein said map data is stored in a wrap around manner in said scan memory and said map data is transferred one row or column at a time to update said scan memory means, said included means for generating update parameters further includes means for generating a starting addresses for the row and column of the scan memory means where first bit of the map data being transferred to the scan memory means is to be stored and said scan memory address generator means generates sequential addresses for the remaining bits of map data being transferred to said scan memory means along said row or column in a wrap-around manner.

4. The moving map display of claim 3 wherein said visual display has a scan pattern comprising two interlaced fields of map data, said included means for generating scan parameters generates first starting addresses for the first field and second starting addresses for the second field and scan parameters enabling said scan memory address generator means to generate sequential addresses along every other parallel line beginning with said first starting addresses to generate said first field of map data and to generate sequential addresses along the parallel lines between said every other parallel line beginning with said second starting addresses to generate said second field of map data interlaced with said first field of map data.

5. The moving map display of claim 3 wherein said included means for computing a desired map center computes said desired map center coincident with said vehicle's coordinate position.

6. The moving map display of claim 5 wherein said moving map display further includes operator actuated means for generating an offset signal, said included means for computing a desired map center is further responsive to said offset signal and said heading signal for generating a desired map center offset a predetermined distance from the vehicle's coordinate position in a direction opposite the direction in which the vehicle is moving.

7. The moving map display of claim 1 wherein said moving map display further includes an operator actuated means for generating a zoom signal having at least a first value and a second value, said include means for generating scan parameters is further responsive to the first value of said zoom signal to generate a starting address and scan parameters enabling said scan memory address generator means to generate addresses sequentially to output said digital data from storage locations within a first predetermined area of said scan memory means and responsive to the second value of said zoom signal to generate a starting address and scan parameters enabling said scan memory address generator means to generate addresses to output said digital data from a second predetermined area within said scan memory means centered about said desired map center, said second predetermined area being smaller than said first predetermined area.

8. The moving map display of claim 7 wherein said means for generating a zoom signal generates a zoom signal having values variable between said first and second values and wherein said means for generating scan parameters is further responsive to the value of said zoom signal to generate a starting address and scan parameters enabling said scan memory address generator to generate addresses sequentially outputting said digital data from storage locations within an area of said scan memory means dependent upon the value of said zoom signal.

9. The moving map display of claim 6 wherein said moving map display further includes operator actuated means for generating a display mode signal having a first value indicating the displayed map is to have a north-up orientation with the top of the map representing a northerly direction and a second value indicating the displayed map is to have a heading-up orientation in which the vehicle's direction of motion is always towards the top of the displayed map, said included means for generating scan parameters generates said scan parameters enabling said scan memory address generator means to generate sequential addresses along said rows in response to the first value of said diaplay mode signal and generates said scan parameters enabling said scan memory address generator means to generate sequential addresses along parallel lines in said scan memory means said parallel lines disposed in a direction normal to the vehicle's direction of motion in response to the second value of said display mode signal.

10. The moving map display of claim 9 wherein said included means for generating a desired map center is further responsive to the second value of said display mode signal and said heading signal for generating said desired map center displaced from the coordinate position of the vehicle a predetermined distance in a direction opposite the vehicle's direction of motion.

11. The moving map display of claim 10 wherein said display means has a scan pattern comprising two interlaced fields of map data, said included means for generating scan parameters generates in response to the first value of said display mode signal scan parameters enabling said scan memory address generator means to generate a first set of addresses along every other row in said scan memory means to output the digital map data for the first of said two interlaced fields then sequentially generating scan parameters enabling said scan memory address generator means to generate a second set of addresses along the intermediate rows in said scan memory means to output the digital map data for the other field of map data and generates in response to the second value of said display mode signal and said heading signal scan parameters enabling said scan memory address generator means to generate a first set of addresses along every other of said parallel lines normal to the vehicle's direction of motion to output the digital data for the first of said two interlaced fields then sequentially generating scan parameters enabling said scan memory address generator means to generate said second set of addresses along the intermediate parallel lines normal to the vehicle's direction of motion to output the digital data for the other of said two interlaced fields of map data.

12. The moving map display of claim 11 wherein said display means generates a multi-color map said scan memory means comprises at least three parallel scan memory planes having corresponding storage elements in each plane and wherein said corresponding storage elements in each of said scan memory planes has the same address and said corresponding storage elements collectively store a three bit digital word indicative of a color, and wherein said converter means includes a decoder responsive to said three bit digital word output from the scan memory means and said pixel signals for generating signals enabling said display means to generate a pixel of map information having the color represented by the three bit digital word.

13. The moving map display of claim 1 wherein said display means generates a multi-color map said scan memory means comprises at least three parallel scan memory planes having corresponding storage elements on each of said planes and wherein said corresponding storage elements on each of said scan memory planes has the same address and said corresponding storage elements collectively store a three bit digital word indicative of a color, and wherein said converter means includes a decoder responsive to said three bit word output from the scan memory means and said pixel signals for generating signals enabling said display means to generate a pixel of map information having the color represented by the three bit digital word.

14. The moving map display of claims 12 or 13 wherein said display means is a color cathode ray tube having three color guns, one for each of the three primary additive colors, said decoder means outputs a digital color signal indicative of the color corresponding to the three bit word and wherein said converter means further includes a plurality of amplifiers responsive to said digital color signal for generating a corresponding analog signal for each of said three color guns.

15. The moving map display of claim 12 wherein said scan memory means further includes a fourth parallel scan memory plane containing additional map information, and wherein said decoder is further responsive to the map data output from said fourth scan memory plane for generating signals enabling said display means to display said additional map information.

16. The moving map display of claim 13 wherein said scan memory means further includes a fourth parallel scan memory plane containing additional map information, and wherein said decoder is further responsive to the map data output from said fourth scan memory plane for generating signals enabling said display means to display said additional map information.

17. The moving map display of claims 15 or 16 further including means for generating a de-clutter signal and wherein said decoder is further responsive to said de-clutter signal to discard the digital data data output from said fourth scan memory plane.

18. A moving map display for a vehicle having means for generating coordinate signals corresponding to the vehicle's current latitude and longitude coordinate position and a heading signal indicative of the vehicle's direction of motion, said moving map display comprising;

- mass memory means for storing digital data corresponding to a map of the region to be traversed by the vehicle;
- scan memory means for storing digital data corresponding to a portion of said map, said portion having a predetermined relationship to the current coordinate position of the vehicle;
- means responsive to said coordinate and heading signals for transferring new data from said mass memory means to said scan memory means to maintain said predetermined relationship between said portion of the map stored in said scan memory means and the current coordinate position of the vehicle;
- means responsive to said predetermined relationship between said portion of the map stored in the scan memory means and the current coordinate position of the vehicle and said heading signals for generating scan parameter signals including the starting addresses in the scan memory means where the scan is to begin to generate a visual display and incremental values indicative of the vehicle's heading;
- means responsive to said scan parameter signals for scanning said scan memory means to output said stored digital data in a predetermined sequence along parallel lines the angular orientation of which are controlled by said incremental signals; and
- display means for converting the digital data output from said scan memory means to generate an image of the map stored in said scan memory means.

19. The moving map display of claim 18 wherein said scan memory means comprises a plurality of storage elements arranged in a matrix of parallel rows and parallel columns, each storage element storing at least one bit of digital data, said scan memory stores said bits digital data corresponding to data points lying in an east-west direction along said parallel rows and bits of digital data corresponding to data points on said map lying in a north-south direction along said parallel columns.

20. The moving map display of claim 19 wherein said means scanning further includes means for generating synchronization signals and wherein said display means is further responsive to said synchronization signals to coordinate the operation of said display means with the operation of said means for scanning to generate an image of said map.

21. The moving map display of claim 20 wherein said means for transferring new digital data to said scan memory means transfers complete rows and columns of digital data to said scan memory means to maintain said predetermined relationship between said portion of the map stored in said scan memory means and the coordinate position of the vehicle.

22. The moving map display of claim 21 wherein as a result of a change in the coordinate position of the vehicle, a row or column of digital data currently stored in the scan memory means is no longer required to maintain said predetermined relationship, said means for transferring transfers said complete row or column of new digital data to the respective row or column of digital data no longer required; and wherein said means for scanning is further responsive to the transferring of said rows and columns of new digital data to said scan memory means and generates said addresses in a wrap-around manner to output said new digital data in its proper sequence.

23. The moving map display of claim 21 wherein said means for transferring further includes means responsive to said coordinate signals for generating a desired map center corresponding to the center of said portion of the map stored in said scan memory means.

24. The moving map display of claim 23 wherein said desired map center is coincident with the coordinate position of the vehicle.

25. The moving map display of claim 24 wherein said movable map display further includes an operator activated means for generating an offset signal; and wherein said means for generating a desired map center further includes means responsive to said offset signal and said heading signal for generating said desired map center displaced from the coordinate position of the vehicle a predetermined distance in a direction along the vehicle's direction of motion.

26. The moving map display of claim 19 wherein said display means has a scan pattern comprising two interlaced fields of map data said means for scanning includes means for alternately generating sequential addresses enabling said scan memory means to output said digital map data from every other parallel line to generate a first field of map data and then generating sequential addresses enabling said scan memory means to output said digital map data from the intermediate parallel line to generate a second field of map data interlacing said first field of map data.

27. The moving map display of claim 25 wherein said moving map display further includes an operator actuated means for generating a zoom signal having at least two different values, said means for scanning is further responsive to the first value of said zoom signal to generate said addresses enabling said scan meory means to output said digital data stored in sequential storage elements along said parallel lines, and responsive to said the second value of said zoom signal to generate said addresses enabling said scan memory to output said digital data from said storage elements along said parallel lines in a sequence operative to produce a map image in said display means having a predetermined magnification with respect to the map image produced in response to said first zoom signal.

28. The moving map display of claim 27 wherein said means for generating a zoom signal generates a zoom signal having a value variable between said first and second values and wherein said means for scanning generates address enabling said scan memory to output said digital data from the storage elements along said parallel lines in a sequence operative to produce a map image on said display means having a magnification variable as a function of to the value of said zoom signal.

29. The moving map display of claim 25 wherein said movable map display further includes an operator actuated means for generating a display mode signal having a first value indicating the displayed map is to have said north-up orientation and a second value indicating the displayed map is to have a heading-up orientation wherein the vehicles direction of motion is always towards the top of the displayed map, said means for scanning is responsive to said first value of said mode display signal for generating addresses enabling said scan memory means to sequentially output the digital data stored in storage locations along said rows, and is further responsive to the second value of said display mode signal and said heading signal for generating addresses enabling said scan memory means to sequentially output the digital data store in storage elements lying along parallel lines disposed normal to the vehicle's direction of motion.

30. The moving map display of claim 29 wherein said means for generating a desired map center further includes means responsive to the second value of said display mode signal for generating said desired map center displaced from the coordinate position of the vehicle a predetermined distance in a direction along the vehicle's direction of motion.

31. The moving map display of claim 30 wherein said display means has a scan pattern comprising two interlaced fields of map data said means for scanning includes means responsive to the second value of said mode signal for alternately generating sequential addresses enabling said scan memory means to output the digital data from the storage elements disposed along every other of said parallel rows to generate a first field of map data then generating sequential addresses enabling said scan memory means to output the digital data from the storage elements disposed along the intermediate parallel rows to generate a second field of map data interlaced with said first field of map data.

32. The moving map display of claim 31 wherein said display means comprises:
means for converting the digital map data to an analog signal;
means responsive to said synchronization signals for generating horizontal and vertical scan signals in synchronization with said means for scanning; and
a cathode ray tube responsive to said analog signal and said horizontal and vertical scan signals for generating a visual pixel of map image information for each bit of digital map data output from said scan memory means and wherein the individual pixels produced by a complete scan of said scan memory means collectively produce said map.

33. The moving map display of claim 32 wherein said cathode ray tube is a color cathode ray tube capable of producing a multi-color display, said scan memory means comprises at least three parallel scan memory planes having corresponding storage elements on each of said three planes and wherein said corresponding storage elements on each of said scan memory planes has the same address and collectively store a three bit digital word indicative of the color of the stored data bit; and
wherein said means for converting said digital map data includes a decoder responsive to the three bit digital word output from said three parallel scan memory planes for a generating color signal indicative of the color corresponding to said 3 bit word; and
amplifier means responsive to said color signal for generating signals enabling said color cathode ray tube to generate a pixel of map information having a color corresponding to the color indicated by said three bit digital word.

34. The moving map display of claim 33 wherein said scan memory means includes a fourth parallel scan memory plane containing additional map information, and wherein said decoder is further responsive to the map data output from said fourth parallel scan memory plane for generating signals enabling said color cathode ray tube to display said additional map information.

35. The moving map display of claim 34 wherein said moving map display further includes means for generating a de-clutter signal and wherein said decoder is further responsive to said de-clutter signal to discard the digital data output from said fourth parallel scan memory plane.

36. A method for generating a moving map display for a vehicle, wherein the vehicle has means for generating coordinate signals indicative of the vehicle's current lattitudinal and longitudinal coordinate position and a heading signal indicative of the vehicle's direction of motion, said method comprising the steps of:
storing digital map data corresponding to a map of the region to be traversed by the vehicle to generate a mass memory;
storing digital map data corresponding to a portion of said map to generate a scan memory, said portion of said map having a predetermined relationship to the current coordinate position of the vehicle;
transferring in response to said coordinate signals digital map data from said mass memory to said scan memory to maintain said predetermined relationship between the portion of said map stored in the scan memory and the current coordinate position of the vehicle;
calculating from said coordinate and heading signals starting addresses and incremental values indicative of the vehicle's direction of motion to generate a set of scan parameters;
generating in response to said scan parameters addresses to output the digital map data stored in the scan memory along parallel lines in a predetermined sequence the angular orientation of said parallel lines being controlled by said incremental values; and
enabling a display means with the digital map data output from the scan memory to generate a visual image of the portion of the map stored in the scan memory.

37. The method of claim 36 wherein said scan memory comprises a plurality of storage elements arranged in a matrix of parallel rows and parallel columns and each storage element stores at least one bit of digital map data, said step of storing digital map data to generate a scan memory stores said bits of digital map data corresponding to data points lying in an east-west direction along said parallel rows and bits of digital map data corresponding to data points lying in a north-south direction along said parallel columns.

38. The method of claim 37 wherein said step of generating addresses generates addresses to sequentially output the digital map data stored in the storage elements along said parallel lines, one line at a time in a predetermined sequence.

39. The method of claim 38 wherein said step of enabling a display means is coordinated with said step of generating addresses to generate a visual image of said portion of the map having a heading up orientation with the top of the map representing the direction of the vehicle's motion.

40. The method of claim 39 wherein said step of transferring transfers complete rows and columns of digital map data from said mass memory to said scan memory to maintain said predetermined relationship between said portion of the map stored in the scan memory and the coordinate position of the vehicle.

41. The method of claim 40 wherein as a result in the change in the coordinate position of the vehicle, a row or column of digital map data currently stored in the scan memory is no longer required to maintain said predetermined relationship, said step of transferring transfers in a wrap-around manner said complete row or column of digital map data to the respective row or column of digital map data no longer required; and
    wherein said step of generating addresses is further responsive to said step of transferring a row or column of digital map data to the scan memory to generate said addresses in a wrap-around manner to output said digital map data in its proper sequence.

42. The method of claim 40 wherein said step of transferring further includes the step of generating in response to said coordinate signals a desired map center corresponding to the center of said portion of the map stored in said scan memory and wherein said predetermined relationship is the relationship between said desired map center and the coordinate position of the vehicle.

43. The method of claim 42 wherein said step of generating a desired map center generates a desired map center coincident with the coordinate position of the vehicle.

44. The method of claim 42 wherein said method further includes the step of generating an offset signal and wherein said step of generating a desired map center is further responsive to said heading and offset signal for generating a desired map center offset from the coordinate position of the vehicle a predetermined distance in a direction along the vehicles direction of motion.

45. The method of claim 38 wherein said display means has a scan pattern comprising two interlaced fields of map data said step of generating addresses first generates a set of sequential addresses enabling said scan memory to output said digital map data from every other parallel line to generate said first field of map data then generate a set of sequential addresses enabling said scan memory means to output said digital map data from the intermediate lines to generate said second field of map data.

46. The method of 45 wherein said method further includes the step of generating a zoom signal having at least two different values, said step of generating addresses further includes the steps of:
    generating in response to the first value of said zoom signal addresses to sequentially output the digital map data from within a first predetermined area of said scan memory centered about said desired map center enabling said display means to generate a visual image having a first magnification; and
    generating in response to the second value of said zoom signal said addresses to sequentially output the digital map data from within a second predetermined area of said scan memory centered about the coordinate position of the vehicle, said second predetermined area being smaller than said first predetermined area and enabling said display means to generate a visual image having a magnification greater than said first magnification.

47. The method of claim 46 wherein said step of generating a zoom signal generates a zoom signal having a value variable between said first and said second value, said step of generating addresses generates in response to the value of said zoom signal addresses to sequentially output the digital map date from within an area of said scan memory centered about the coordinate position of the vehicle having a sized determined by the value of said zoom signal.

48. The method of claim 44 wherein said method further includes the step of generating a display mode signal having a first value indicating the displayed map is to have said north-up orientation and a second value indicating the displayed map is to have a heading-up orientation wherein the vehicle's direction of motion is always towards the top of the displayed map, said step of generating addresses is responsive to said first value of said display mode signal for generating addresses enabling said scan memory to sequentially output digital map data stored in storage elements lying along said rows of storage elements and is further responsive to the second value of said display mode signal and said heading signal for generating addresses enabling said scan memory to sequentially output said digital map data stored in storage elements lying along parallel lines disposed normal to the vehicles direction of motion.

49. The method of claim 48 wherein said step of generating a desired map center is further responsive to the second value of said display mode signal to generate said desired map center displaced from the coordinate position of the vehicle a predetermined distance in a direction along the vehicle's direction of motion.

50. The method of claim 49 wherein said display means has a scan pattern comprising two interlaced fields of map data, said step of generating addresses is further responsive to the second value of said display mode signal to alternately generate sequential addresses enabling said scan memory to output the digital map data from the storage elements disposed along every other of said parallel lines normal to the vehicle's direction of motion to generate a first field of map data then generate sequential addresses enabling said scan memory to output the digital map data from the storage elements disposed along the intermediate parallel lines normal to the vehicle's direction of motion to generate a second field of map data interlacing said first field of map data.

51. The method of claim 50 wherein said step of generating addresses further includes the steps of generating synchronization signals, said step of enabling a display means includes the steps of:
    converting said digital map data received from the scan memory to a corresponding analog signal;
    generating horizontal and vertical scan signals in responses to said synchronization signals synchronizing said step for generating addresses with the generation of said horizontal and vertical scan signals; and
    enabling a cathode ray tube with said analog signals and said vertical and horizontal scan signals to generate a visual pixel of map information for each bit of a digital map data output from said scan memory and wherein the individual pixels produced by said first and second fields of map data output from the scan memory collectively produce a visual image of said map.

52. The method of claim 51 wherein said display means is a color cathode ray tube, capable of producing a multicolor map and said scan memory comprises at least three parallel scan memory planes having corresponding storage elements, wherein said corresponding storage elements on each of said parallel scan memory planes has the same address and collectively store a three bit digital word indicative of the color of the stored digital map data bit; and wherein said step of converting said digital map data includes the steps of:

decoding said three bit digital word output from said at least three parallel scan memory planes to generate a color signal indicative of the color identified by said 3 bit word; and amplifying said color signal to generate signals enabling said color-cathode ray tube to generate a pixel of map information having a color corresponding to the color indicated by said color signal.

53. The method of claim 52 wherein said scan memory includes a fourth parallel scan memory plane containing additional map information and wherein said step of decoding is further responsive to the digital map data output from said fourth parallel scan memory plane for generating signals enabling said color cathode ray tube to display said additional map information.

54. The method of claim 53 wherein said method further includes the step of generating a de-clutter signal, said step of decoding is further responsive to said de-clutter signal to discard the digital map data received from said fourth parallel scan memory plane, thereby removing said additional information from said displayed map.

* * * * *